(12) United States Patent
Takebe

(10) Patent No.: US 6,563,949 B1
(45) Date of Patent: May 13, 2003

(54) CHARACTER STRING EXTRACTION APPARATUS AND PATTERN EXTRACTION APPARATUS

(75) Inventor: Hiroaki Takebe, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/198,460

(22) Filed: Nov. 24, 1998

(30) Foreign Application Priority Data

Dec. 19, 1997 (JP) .......................................... 09-351353
May 27, 1998 (JP) .......................................... 10-146199

(51) Int. Cl.[7] .......................... G06K 9/32; G06K 9/34; G06K 9/36; G06K 9/46; H04N 9/74
(52) U.S. Cl. ........................ 382/190; 382/164; 382/173; 382/177; 382/178; 382/180; 382/181; 382/284; 382/295; 348/584
(58) Field of Search ................................. 382/171, 173, 382/177, 178, 180, 181, 190, 203, 162, 164, 165, 276, 284, 295; 348/584

(56) References Cited

U.S. PATENT DOCUMENTS

| | | | |
|---|---|---|---|
| 3,999,161 A | * 12/1976 | van Bilzem et al. | 382/203 |
| 5,048,109 A | 9/1991 | Bloomberg et al. | 382/164 |
| 5,197,107 A | * 3/1993 | Katsuyama et al. | 382/209 |
| 5,335,294 A | * 8/1994 | Niki | 382/177 |
| 5,581,633 A | * 12/1996 | Hotta et al. | 382/171 |
| 5,757,957 A | 5/1998 | Tachikawa | 382/176 |
| 5,892,843 A | * 4/1999 | Zhou et al. | 382/171 |
| 5,911,005 A | 6/1999 | Uchiyama | 382/187 |
| 5,931,784 A | * 8/1999 | Kajiwara et al. | 600/441 |
| 5,949,906 A | * 9/1999 | Hontani et al. | 382/177 |
| 5,991,435 A | * 11/1999 | Tsujikawa et al. | 382/147 |
| 6,081,616 A | * 6/2000 | Vaezi et al. | 382/171 |

FOREIGN PATENT DOCUMENTS

| | | | |
|---|---|---|---|
| EP | 0 567 344 A2 | 10/1993 | ............ G06K/9/20 |
| JP | 8-123901 | 5/1996 | |
| JP | 8-194780 | 7/1996 | ............ G06K/9/62 |
| JP | 05233873 A | 11/1996 | |

OTHER PUBLICATIONS

Lu Y et al: "Character segmentation in handwritten words —an overview" Pattern Recognition, Pergamon Press Inc. Elmsford, N.Y., US vol. 29, No. 1.

H. Jaekuy, "Document Page Decomposition Using Boulding Boxes of Counnected Components of Black Pixels", SPIE, vol. 2422, pp. 140–151.

"Detection of Courtesy Amount Block on Bank Checks", Arun Agarwal et al., Journal of Electronic Imaging, vol. 5, No. 2, pp. 214–224.

"Study of Extracting Japanese Newspaper Article", by J. Toyota et al., Proceedings of the International Joint Conference on Pattern Recognition, pp. 113–115.

* cited by examiner

Primary Examiner—Leo Boudreau
Assistant Examiner—Daniel G. Mariam
(74) Attorney, Agent, or Firm—Staas & Halsey LLP

(57) ABSTRACT

The connected elements of an input image are obtained and grouped based on the relative positions of the connected elements and the similarity in thickness. Then, the character recognition level of a group is obtained by performing a character recognizing process. The obtained character recognition level is weighted by the area of a rectangular area. Using a total of the weighted values as an evaluation value of the group, the evaluation value is obtained for all combinations in all groups. The combination of the groups having the highest evaluation value is extracted as a character string.

9 Claims, 30 Drawing Sheets

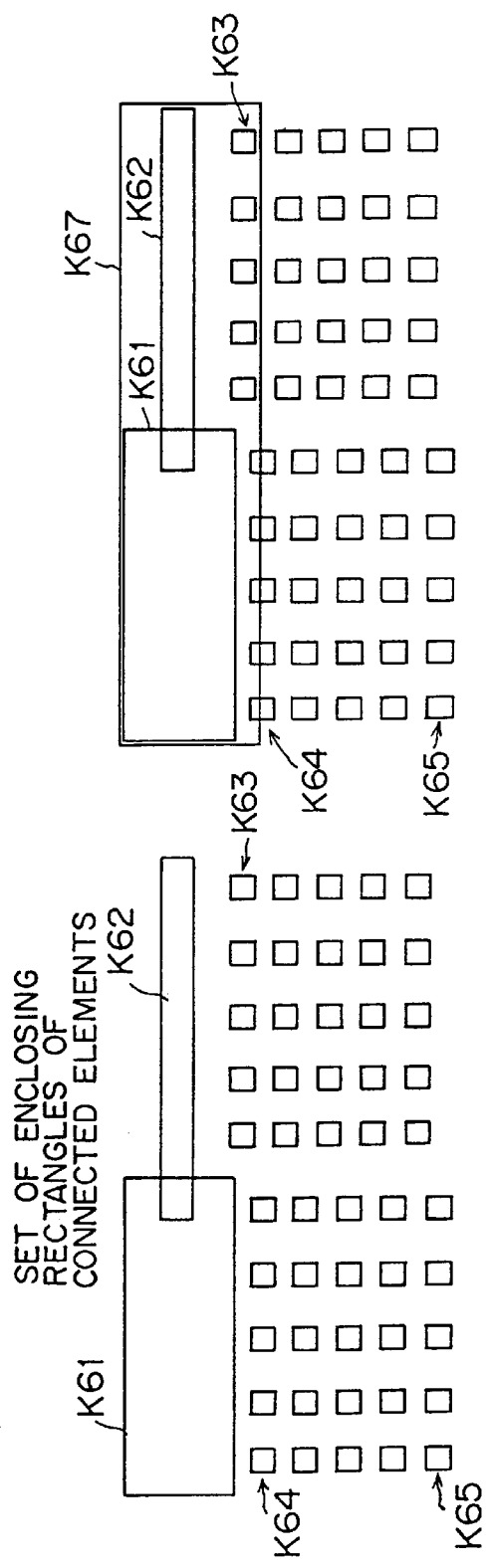
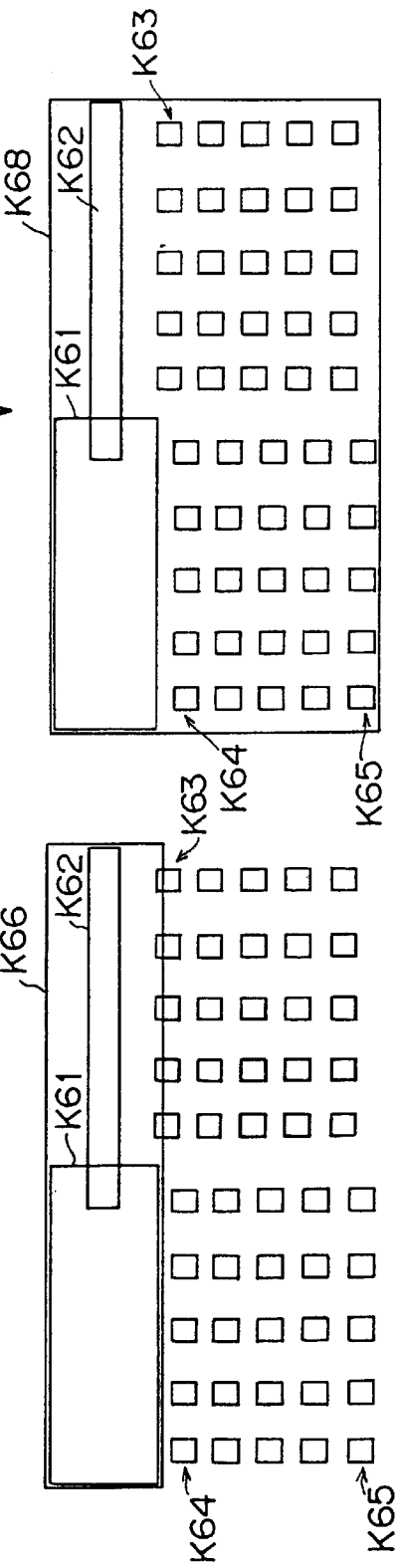

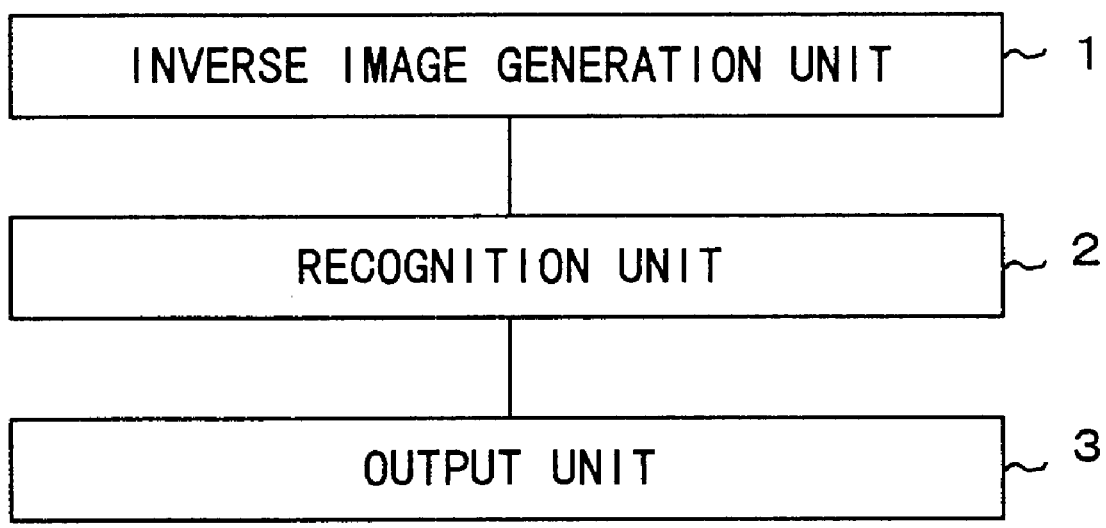
F I G. 2

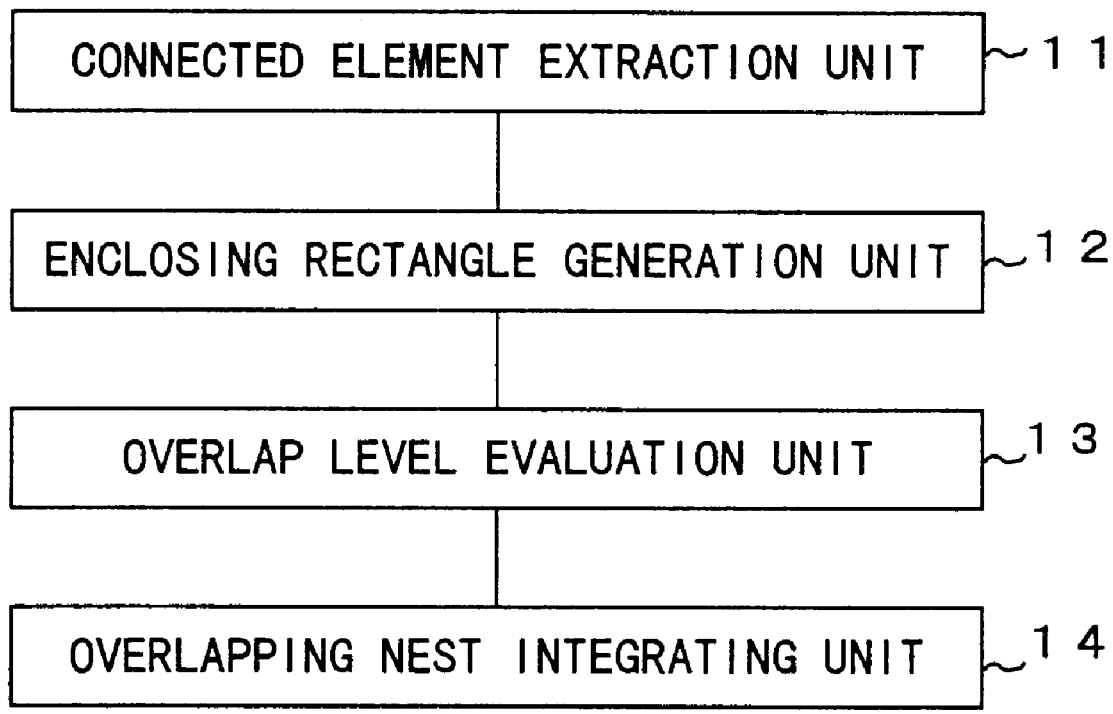
F I G. 3

GROUPING

[ INPUT IMAGE ]   [ INVERSE IMAGE ]

COMBINING

EXTRACTION RESULT

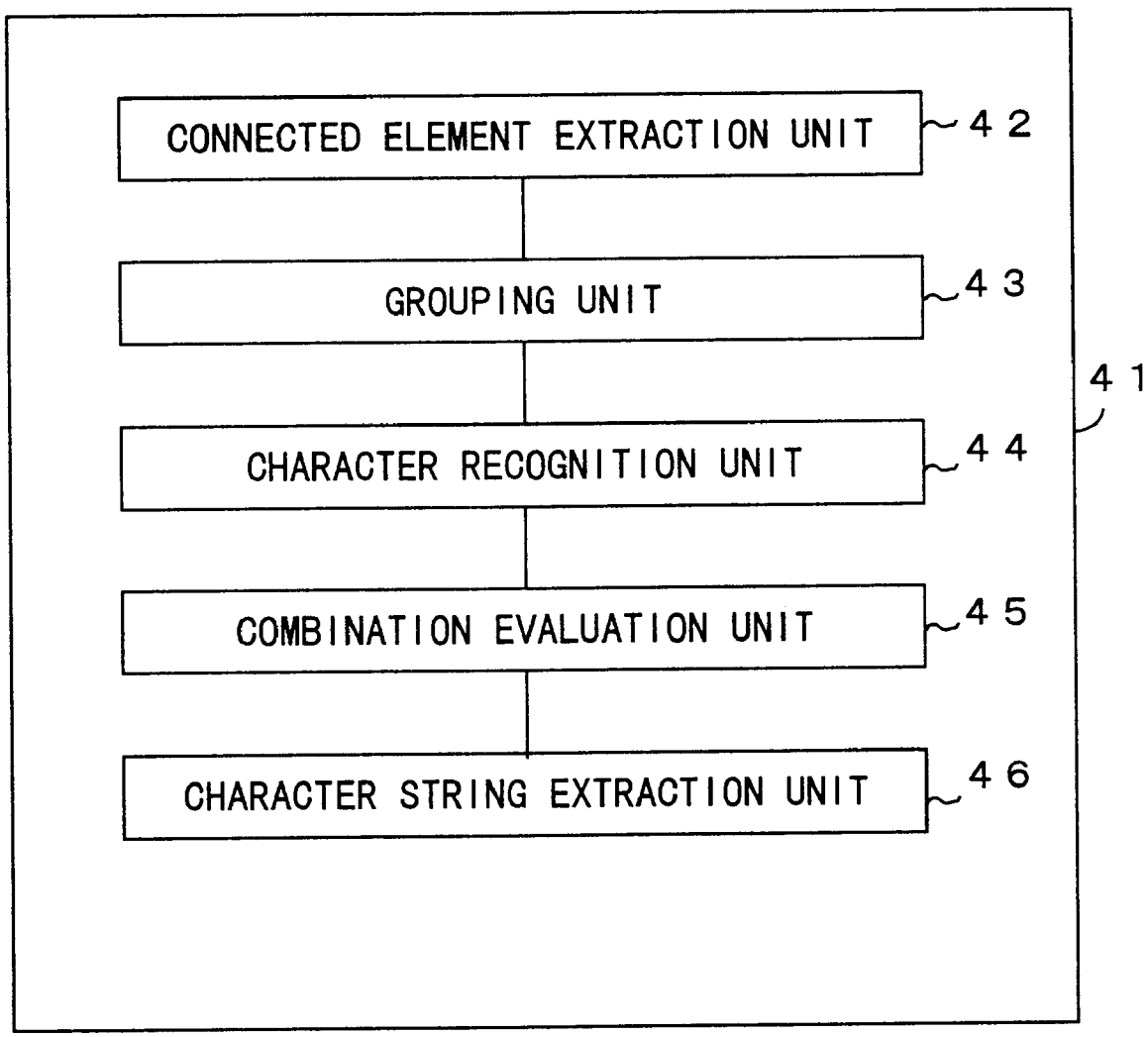
F I G. 6

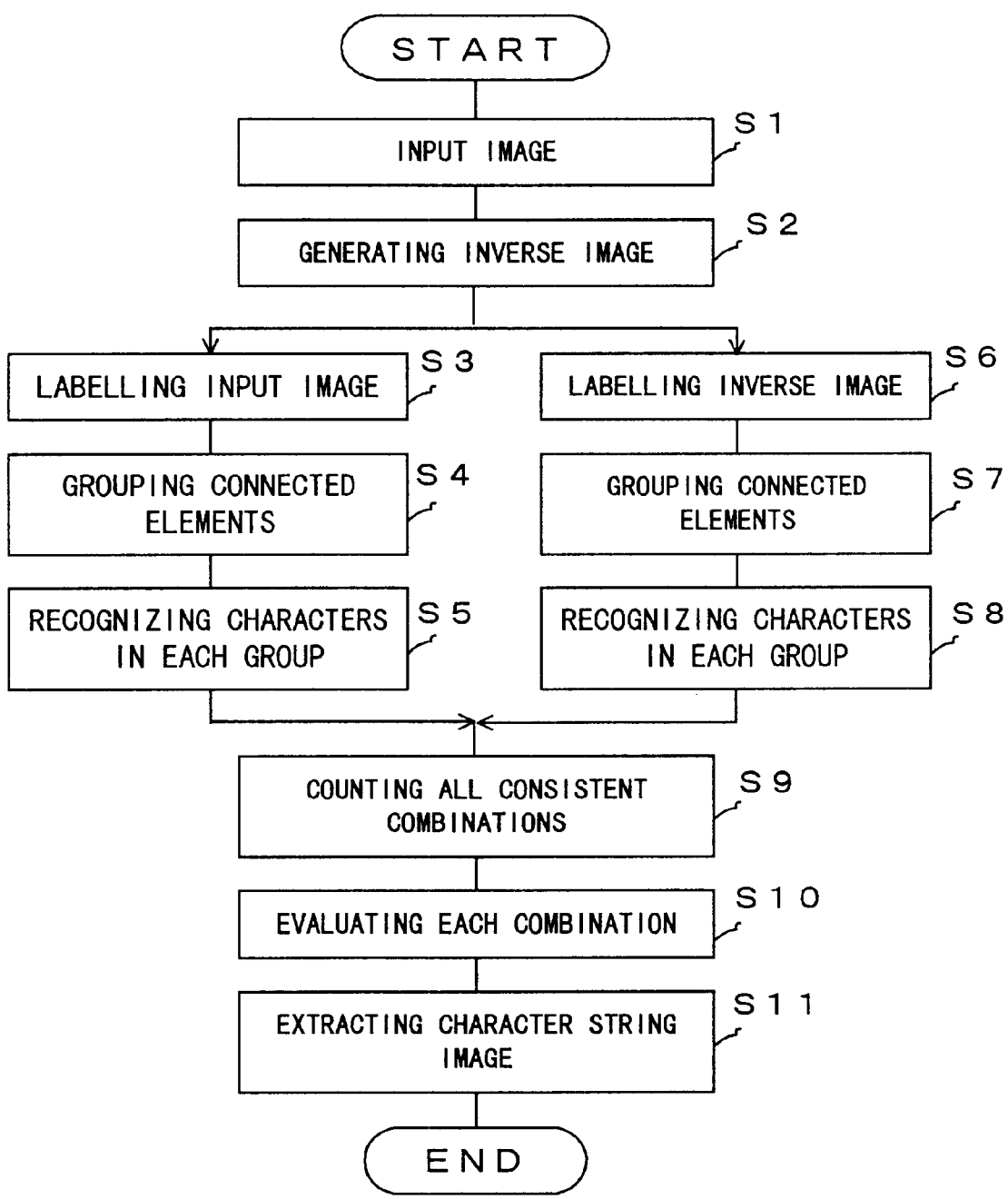
F I G. 7

CONNECTED ELEMENT A

CONNECTED ELEMENT C

CONNECTED ELEMENT B IN VICINITY OF A

FAMILIAL SIMILARITY OF B TO A
= $d/nx + 0.1 \times max(ta,tb)/min(ta,tb)$ ta : AVERAGE THICKNESS OF A
tb : AVERAGE THICKNESS OF B (AVERAGE THICKNESS = NUMBER OF BOUNDARY PICTURE ELEMENTS / TOTAL NUMBER OF PICTURE ELEMENTS

● INDICATES A GROUP

THE PATH (———) BETWEEN ● AND ● INDICATES THAT CORRESPONDING GROUP DO NOT OVERLAP EACH OTHER

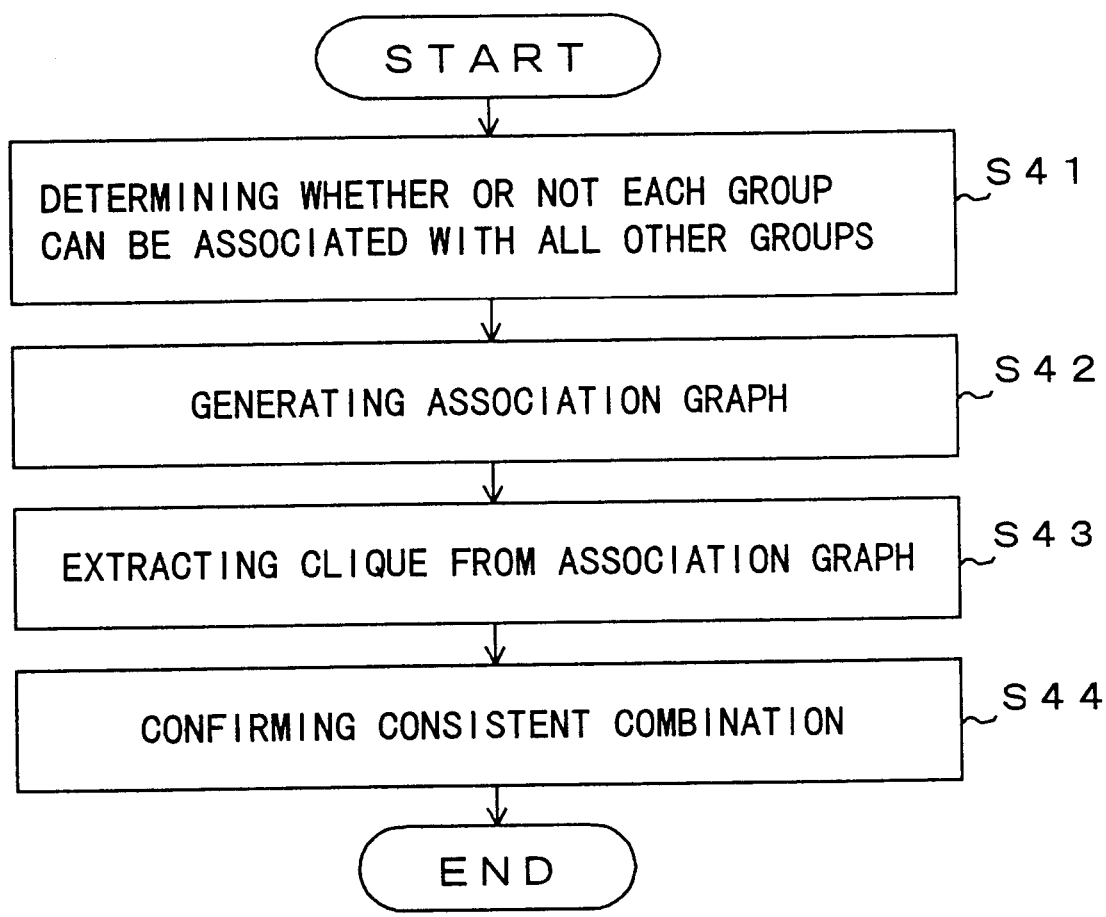
F I G. 1 6

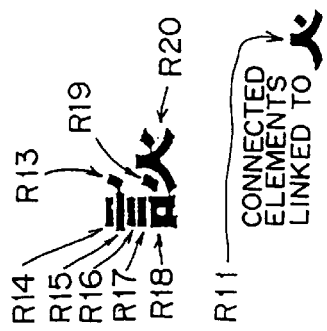
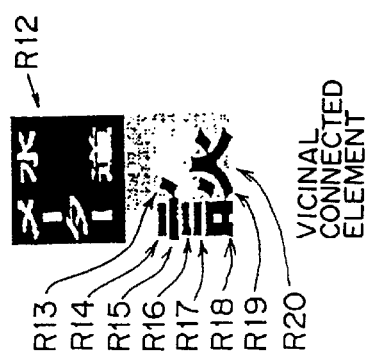
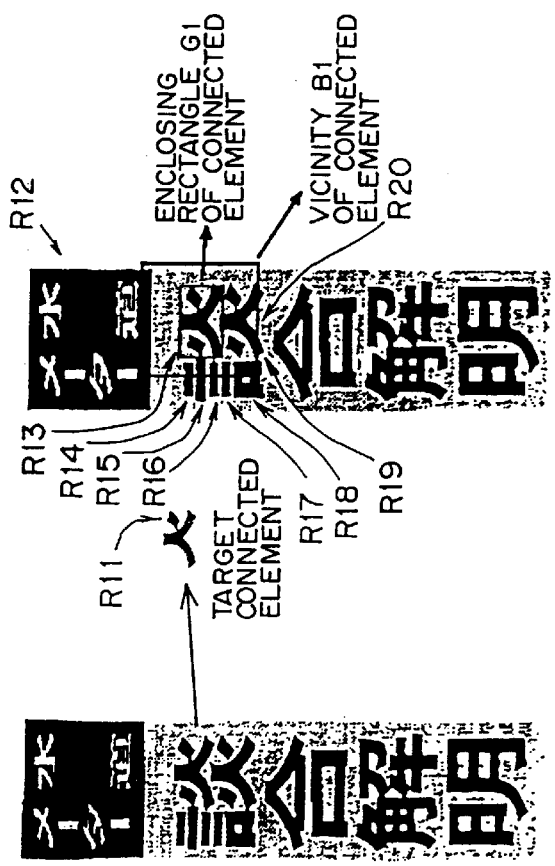
FIG. 17A  FIG. 17B  FIG. 17C  FIG. 17D

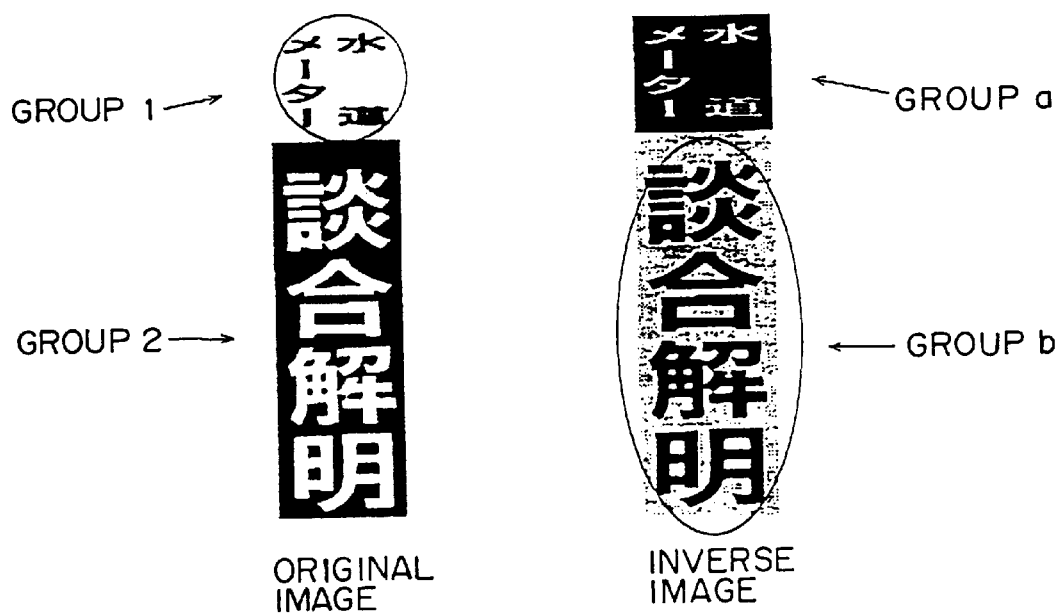
FIG. 18A
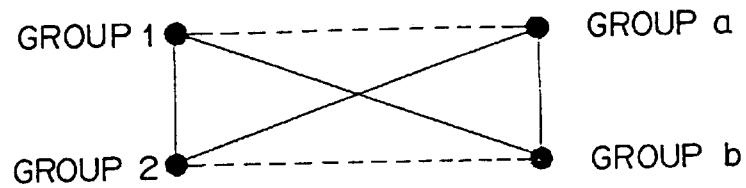
FIG. 18B
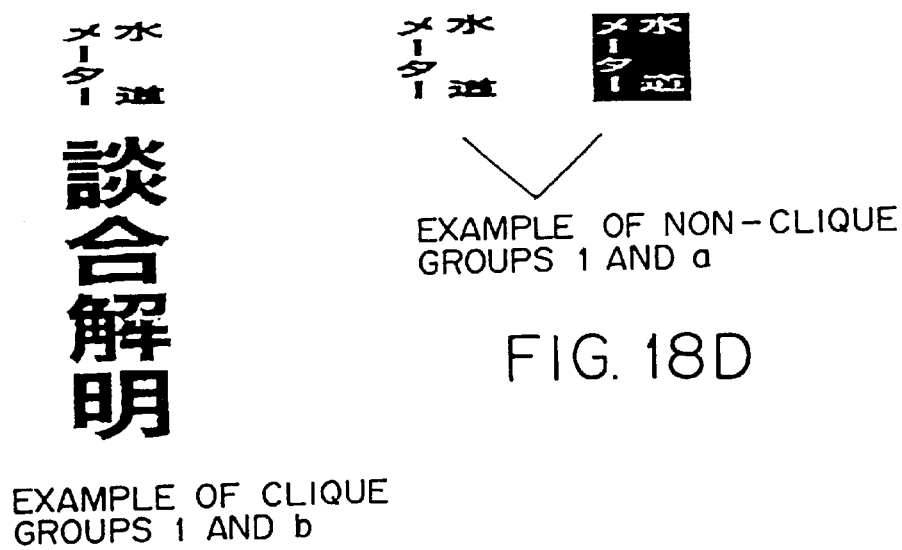
FIG. 18C
FIG. 18D

CONVERSION ↓

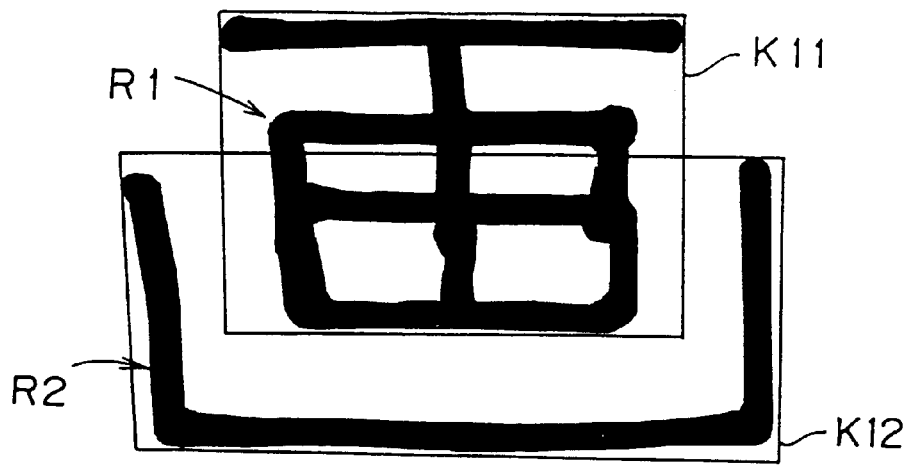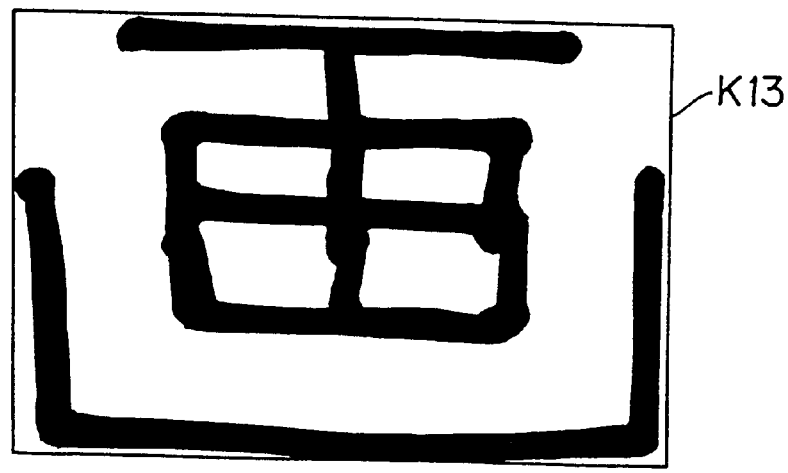
FIG. 25

CHARACTER STRING EXTRACTION APPARATUS AND PATTERN EXTRACTION APPARATUS

BACKGROUND OF THE INVENTION

1. Field of the Invention

The present invention relates to image recognizing technology for reading documents, drawings, etc., and more specifically to character string extracting technology for extracting a character string such as a headline from an image.

2. Description of the Related Art

When a document is electronically filed, it is indispensable to assign a keyword to the document. However, it is a very annoying process for a user. Therefore, it is significant to successfully automate this process and efficiently perform an electronic filing process.

In newspapers and magazines, it is the most efficient to automatically extract a headline, recognize characters forming the headline, and define it as a keyword because a headline indicates a lot of characteristics of the contents of a document, and can be easily retrieved from the document.

As a result, technology of shortening the time taken to extract a keyword, and of correctly extracting a keyword (for example, Tokkaihei 4-287168 which discloses a method of automatically extracting a keyword from a file) has been developed.

In this method, it is assumed that the descriptions of a drawing, a photograph, and a table are positioned at the top or foot of each of them to be described. Thus, the descriptions can be extracted as a character string or a character string area, and the characters forming the descriptions are recognized and entered as a keyword.

Also, technology of extracting a character string from an image (for example, Tokkaihei 8-293003 which discloses a character string extracting method and a character string extraction apparatus based on the method, a character string recognizing apparatus and a character string recognizing system) has been developed.

In this example, all characters in the image are extracted, continuous characters are grouped as a character string, the feature amount of each group is compared with an entered feature amount model, discriminated, and extracted as a character string. Continuous characters refers to a character string, and a feature amount refers to a type and size of a character such as a kanji (Chinese character), a numerical character, etc.

Thus, there are various documents and drawings to be treated in an electronic filing process, and there are various image recognition technology. When a character string is extracted from an image, the most popular method is to process a headline which has its background as often seen in newspapers.

First, it is determined whether an input image contains vertically arranged characters or horizontally arranged characters. Then, a labelling process is performed on the input image and its black/white inverse image to obtain connected elements having a series of picture elements in the same color.

Next, a character candidate is found based on the size, thickness, and relative position of each connected element. The character candidate obtained from the connected element of an input image is referred to as a black character candidate, and the character candidate obtained from the connected element of an inverse image is referred to as a white character candidate. The color of characters is determined from the number of black character candidates and white character candidates. When the character color is black, only the connected elements of an input image are to be processed in the subsequent steps. When the character color is white, only the connected elements of the black/white inverse image are to be processed thereafter.

Next, a character string area is obtained after merging the connected elements to be processed. The connected element which is contained in the character string area and is equal to or larger than a threshold in thickness is extracted as a character element. The threshold is a value indicating a constant ratio to the maximum value in thickness of a connected element. Finally, the connected element extracted as a character element is generated as an image, and is defined as a character string in a character recognizing process.

To correctly extract a headline, precise integration technology for a black picture element area belonging to the same character string is required.

The following conventional method relates to this technology.

After performing a pre-process such as adjusting a tilt, removing a character-box line, etc., the entire image is labelled, and an overlapping nest integrating process is performed on the obtained black picture element connection areas. Then, the character size of the text of the entire document is determined from the obtained black picture element connection area. Based on the value, the attribute of each connection area is determined. When it is determined that the attribute of a rectangle is a character, vertical or horizontal integration is repeated on the rectangle, thereby defining a character string.

However, in the conventional technology, the character color is determined during the character extracting process, and the character line width is fixed to a standard value. Furthermore, a character string area is set in line units (or in column units). Therefore, it has been a problem that it is quite difficult to extract a character string from a complicated image comprising a background pattern containing a combination of white and black portions, various types of fonts, a color document, a plurality of lines, a combination of vertical and horizontal character strings, and a compound of them.

Furthermore, the relationship between black character candidates and white character candidate in number is not a reliable criterion for determining a character color. When the character color is determined during the character extracting process, the determination is irrevocable if it is mistakenly made, thereby failing in the final character recognition.

Additionally, when the character line width is fixed to a standard value, a character element printed by a comparatively thin line can be easily lost, thereby failing in the final character recognition.

Furthermore, since the overlapping nest integrating process is performed on black picture element connection areas in the conventional technology, portions which should not be originally integrated are sequentially integrated, thus finally and incorrectly integrating the entire document.

For example, when the tilt of the entire document cannot be adjusted, or the character-box line cannot be completely removed, the entire document can be integrated in the overlapping nest integrating process.

FIG. 1 shows an example of integrating the entire document in the conventional overlapping nest integrating process.

In FIG. 1A, it is assumed that the enclosing rectangles K61 through K65 of the connected elements have been obtained from an input image. When the overlapping nest integrating process is performed on the enclosing rectangles K61 through K65 of the connected elements, the enclosing rectangle K61 and the enclosing rectangle K62 are integrated because they overlap each other. As a result, as shown in FIG. 1B, an enclosing rectangle K66 enclosing the enclosing rectangle K61 and the enclosing rectangle K62 is generated. When the enclosing rectangle K66 is generated, the enclosing rectangle K66 overlaps the enclosing rectangle K63. Therefore, they are integrated, and the enclosing rectangle K67 encompassing the enclosing rectangle K66 and the enclosing rectangle K63 is generated as shown in FIG. 1C. When the enclosing rectangle K67 is generated, the enclosing rectangle K67 overlaps the enclosing rectangle K64. Therefore, they are integrated. Similarly, all enclosing rectangles K61 through K65 shown in FIG. 1A are integrated, and the enclosing rectangle K68 encompassing the enclosing rectangles K61 through K65 is generated as shown in FIG. 1D.

Also, there is the problem that it takes too long a time to perform the overlapping nest integrating process when there is a headline with a photograph, drawing, or texture.

SUMMARY OF THE INVENTION

The first object of the present invention, relating to the technology of recognizing an image by reading a document, drawings, etc., is to provide a character string extraction apparatus for extracting a character string from a complicated image, and recognizing even a thin character line and recognizing a character without mis-recognizing a character color.

The second object of the present invention is to provide a pattern extraction apparatus capable of performing the partially-overlapping nest integrating process.

The character extraction apparatus according to the present invention extracts a character string from an image, and includes: a connected element extraction unit for extracting connected elements containing serial picture elements of the same color based on the color of the picture elements of the input image; a grouping unit for dividing the connected elements into groups probably having the same character strings or the same character string groups based on the relative positions of the connected elements and the ratio of the number of the boundary picture elements to the total number of picture elements forming the connected elements; a character recognition unit for performing a character recognizing process on each group, and defining, as a character recognition level of a group, a sum of the inverse numbers of the distance values of the first character candidates of the recognition results; a combination evaluation unit for defining, as a group evaluation value, a value obtained by weighting the character recognition level of the group by the area of the rectangular area occupied by the group, and defining, as a combination evaluation value, a sum of the group evaluation values of all combinations of groups; and a character string extraction unit for extracting as a character string a combination of groups having the highest combination evaluation value.

The character extraction apparatus according to the present invention extracts connected elements containing a series of black picture elements from an input image and its black/white inverse image when the input image is a binary black-and-white image.

Furthermore, the character extraction apparatus according to the present invention relates only to the groups occupying their rectangular areas not overlapping each other, and obtains all combinations of groups having rectangular areas not overlapping each other.

The storage medium according to the present invention is a computer-readable storage medium which stores a program, and allows the computer to function as a character extraction apparatus, including the following function, for extracting a character string from an image: a connected element extraction function for extracting connected elements containing serial picture elements of the same color based on the color of the picture elements of the input image; a grouping function for dividing the connected elements into groups probably having the same character strings or the same character string groups based on the relative positions of the connected elements and the ratio of the number of the boundary picture elements to the total number of picture elements forming the connected elements; a character recognition function for performing a character recognizing process on each group, and defining, as a character recognition level of a group, a sum of the inverse numbers of the distance values of the first character candidates of the recognition results; a combination evaluation function for defining, as a group evaluation value, a value obtained by weighting the character recognition level of the group by the area of the rectangular area occupied by the group, and defining, as a combination evaluation value, a sum of the group evaluation values of all combinations of groups; and a character string extraction function for extracting as a character string a combination of groups having the highest combination evaluation value.

According to an aspect of the present invention, a combination of portions, whose areas do not overlap each other based on the recognition results of the patterns obtained from an input image and its black/white inverse image, is defined as an extraction result of the pattern from the input image.

In the conventional technology, when characters formed by black picture elements and white characters against the black background co-exist in a headline of newspapers, etc., the color of a character is determined by the number of black character candidates and white character candidates. Therefore, when it is determined that the character color is black, only the connected elements of the input image is to be processed thereafter and a black character can be correctly recognized, but a white character against the black background cannot be recognized. Similarly, when it is determined that the character color is white, only the connected elements of the black/white inverse image is to be processed for character recognition and a white character against the black background can be correctly recognized, but a black character cannot be recognized. According to the present invention, the above described mis-recognition can be avoided. Thus, a character string can be extracted with precision from a complicated image comprising a background pattern containing a combination of white and black portions, various types of fonts, a color document, a plurality of lines, a combination of vertical and horizontal character strings, and a compound of them.

An aspect of the present invention includes a connected element extraction unit for extracting the connected elements of an input image ; an enclosing rectangle generation unit for generating an enclosing rectangle of the connected elements; a histogram generation unit for generating a histogram obtained by weighting the frequency in the input image by the area of the enclosing rectangle; and a character size estimation unit for estimating the size of an enclosing rectangle indicating the maximum value of the histogram as the character size of the input image.

Thus, even if a character is formed by a plurality of separate strokes, not processed in the overlapping nest integrating process, and therefore an enclosing rectangle generated for each stroke remains as is, the enclosing rectangle formed by a part of one character is smaller than an enclosing rectangle formed for an entire character. As a result, the evaluation of the frequency of the enclosing rectangle formed by a part of one character can be set lower, and the influence of the size of a part of a character can be reduced in estimating the size of a character. Therefore, the character size can be estimated with high precision even when the overlapping nest integrating process is not performed.

Another aspect of the present invention includes a grouping unit for grouping the enclosing rectangles generated by the enclosing rectangle generation unit; a box rectangle extraction unit for extracting the second enclosing rectangle which contains more than or equal to a predetermined number of the first enclosing rectangles having a character size estimated by the character size estimation unit; and a box rectangle removal unit for removing the second enclosing rectangle from the enclosing rectangles to be grouped.

Thus, when headline characters are extracted from newspapers, etc., and when a box rectangle enclosing text characters exists near the headline characters, only the box rectangle can be extracted, thereby distinguishing the box rectangle from the enclosing rectangle for the headline characters. As a result, only the headline characters can be extracted with high precision.

A further aspect of the present invention includes a projection unit for projecting the rectangle number assigned to the enclosing rectangle to the coordinates set on the input image. The box rectangle extraction unit extracts the first enclosing rectangle by searching the range of the coordinates of the second enclosing rectangle for the rectangle number contained in the coordinates.

Thus, an enclosing rectangle existing in another enclosing rectangle can be easily extracted. As a result, even if a box rectangle enclosing text characters and headline characters coexist, only the box rectangle can be quickly extracted.

A further aspect of the present invention includes a connected element extraction unit for extracting the connected elements of an input image; an enclosing rectangle generation unit for generating an enclosing rectangle of the connected elements; an overlap level evaluation unit for computing the number of enclosing rectangles overlapping the enclosing rectangle; and an overlapping nest integration unit for performing an overlapping nest integrating process.

Thus, the overlapping nest integrating process is performed only on the enclosing rectangles having a high overlap level, and the process can be omitted on enclosing rectangles having a low overlap level. As a result, an enclosing rectangle of headline characters can be prevented from being lost by enclosing rectangles being integrated on the entire screen, and a part of a drawing or a photograph having a high overlap level can be absorbed or integrated into a larger rectangle. Thus, it can be avoided that an enclosing rectangle of a part of a drawing or a photograph remains as is to be mistakenly extracted as headline characters or mistakenly integrated into a rectangle as headline characters. As a result, headline characters can be extracted with high precision even if the headline characters coexist with a drawing, a photograph, etc.

A further aspect of the present invention includes a projection unit for projecting the rectangle number assigned to the enclosing rectangle to the coordinates set on the input image; and an overlapping rectangle extraction unit for extracting an enclosing rectangle overlapping a predetermined enclosing rectangle by searching the range of the coordinates of the predetermined enclosing rectangle for a rectangle number contained in the coordinates.

Thus, enclosing rectangles overlapping each other can be easily extracted, thereby quickly computing the overlap level of the enclosing rectangles.

BRIEF DESCRIPTION OF THE DRAWINGS

FIG. 1 shows an example of integrating rectangles of the entire document in the conventional overlapping nest integrating process;

FIG. 2 is a block diagram showing the configuration of the pattern extraction apparatus according to the first embodiment of the present invention;

FIG. 3 is a block diagram showing the configuration of the pattern extraction apparatus according to the second embodiment of the present invention;

FIG. 6 is a block diagram showing the configuration of the character extraction apparatus according to the third embodiment of the present invention;

FIG. 7 is a flowchart showing the operation of the character extraction apparatus according to the third embodiment of the present invention;

FIG. 16 is a flowchart showing the method of extracting a group not overlapping another group of connected elements according to an embodiment of the present invention;

FIG. 17 shows the method of linking the connected elements according to an embodiment of the present invention;

FIG. 18 shows examples of clique groups and non-clique groups according to an embodiment of the present invention;

FIG. 25 shows the overlapping nest integration according to an embodiment of the present invention;

DETAILED DESCRIPTION OF THE PREFERRED EMBODIMENTS

Figure 4:
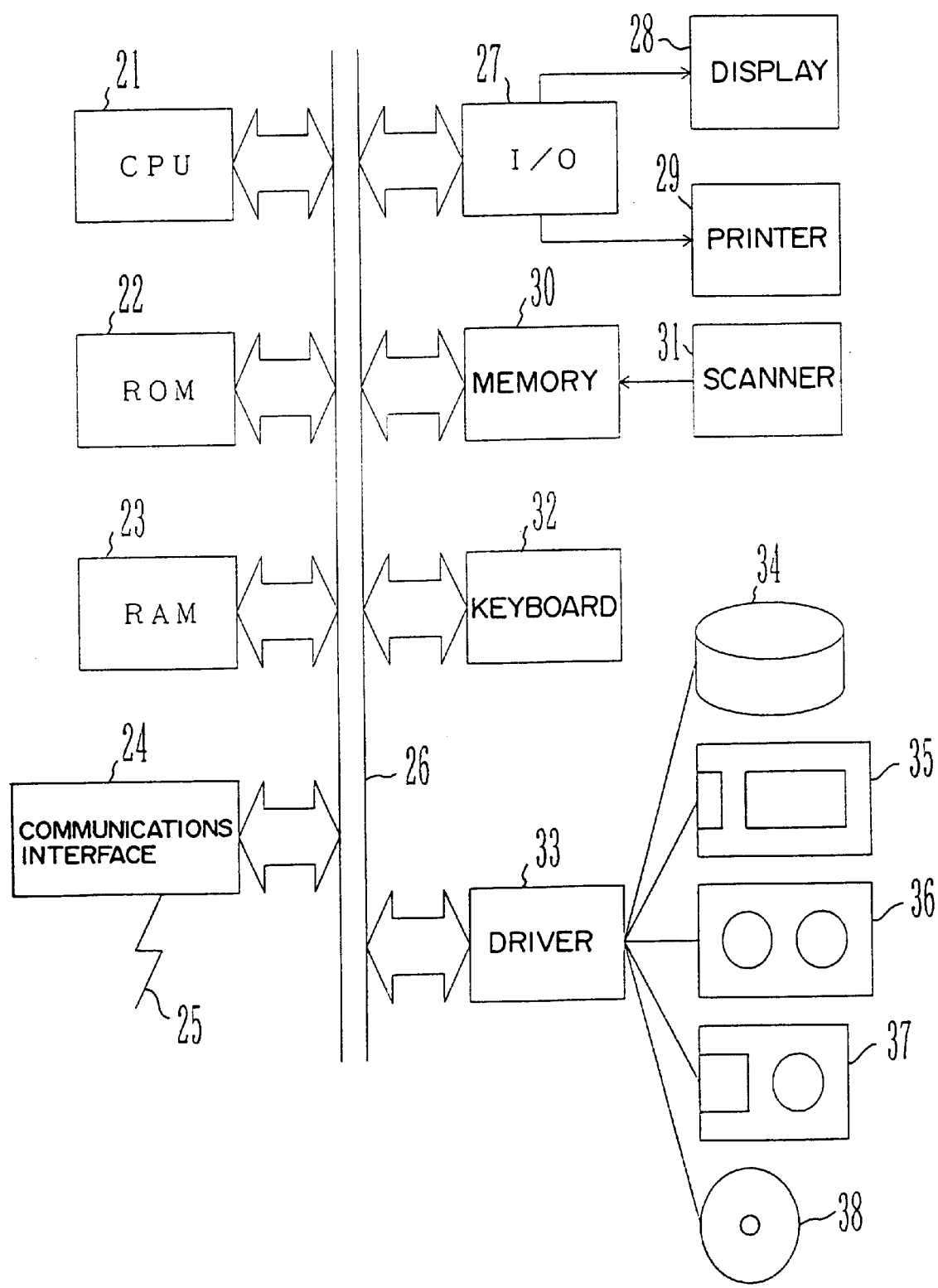
FIG. 4 is a block diagram showing the system configuration of the pattern extraction apparatus according to an embodiment of the present invention.

The pattern extraction apparatus according to an embodiment of the present invention is described by referring to the attached drawings.

FIG. 2 is a block diagram showing the configuration of the pattern extraction apparatus according to the first embodiment of the present invention.

In FIG. 2, an inverse image generation unit 1 generates an inverse image obtained by changing the label of an input image. A recognition unit 2 performs a pattern recognizing process on a pattern extracted from the input image and a pattern extracted from the inverse image generated by the inverse image generation unit 1. An output unit 3 outputs a non-overlapping combination of an area of a pattern extracted from the input image and an area of a pattern extracted from the inverse image generated by the inverse image generation unit 1 as a consistent combination from among the recognition results from the recognition unit 2.

Thus, even if characters formed by black picture elements and white characters against the black background co-exist in a headline of newspapers, etc., the recognizing process can be performed on both characters formed by black picture elements and white characters against the black background. The recognition results of the characters of black picture elements can be output in combination with the recognition results of the white characters against the black background.

In the conventional technology, the color of a character is determined by the number of black character candidates and white character candidates. Therefore, when it is determined that the character color is black, only the connected elements of the input image is to be processed thereafter and a black character can be correctly recognized, but a white character against the black background cannot be recognized. Similarly, when it is determined that the character color is white, only the connected elements of the black/white inverse image is to be processed for character recognition and a white character against the black background can be correctly recognized, but a black character cannot be recognized. According to the present invention, the above described mis-recognition can be avoided. Thus, a character string can be extracted with precision from a complicated image comprising a background pattern containing a combination of white and black portions, various types of fonts, a color document, a plurality of lines, a combination of vertical and horizontal character strings, and a compound of them.

FIG. 3 is a block diagram showing the configuration of the pattern extraction apparatus according to the second embodiment of the present invention.

In FIG. 3, a connected element extraction unit 11 extracts connected elements of an input image. An enclosing rectangle generation unit 12 generates an enclosing rectangle of connected elements extracted by the connected element extraction unit 11. An overlap level evaluation unit 13 computes the number of enclosing rectangles overlapping the enclosing rectangle generated by the enclosing rectangle generation unit 12. An overlapping nest integrating unit 14 performs the overlapping nest integrating process based on the computation result of the overlap level evaluation unit 13.

Thus, the overlapping nest integrating process can be partially performed. That is, the process can be performed only on an enclosing rectangle having a high overlap level, and can be suppressed on an enclosing rectangle having a low overlap level. As a result, the enclosing rectangle of headline characters can be prevented from being lost by enclosing rectangles being integrated on the entire screen.

Furthermore, a part of a drawing or a photograph having a high overlap level can be absorbed or integrated into a larger rectangle. Thus, it can be avoided that an enclosing rectangle of a part of a drawing or a photograph remains as is to be mistakenly extracted as headline characters or mistakenly integrated into a rectangle as headline characters. As a result, headline characters can be extracted with high precision even if the headline characters coexist with a drawing, a photograph, etc.

FIG. 4 is a block diagram showing the system configuration of the character string extraction apparatus according to an embodiment of the present invention.

In FIG. 4, 21 is a central processing unit (CPU) for performing an entire process. 22 is read-only memory (ROM). 23 is random-access memory (RAM). 24 is a communications interface. 25 is a communications network. 26 is a bus. 27 is an input/output interface. 28 is a display for displaying, for example, recognition results of headline characters, etc. 29 is a printer for printing, for example, recognition results of headline characters, etc. 30 is memory for temporarily storing data read by a scanner 31. 31 is a scanner for reading an input image, etc. 32 is a keyboard. 33 is a driver for driving a storage medium. 34 is a hard disk. 35 is an IC memory card. 36 is a magnetic tape. 37 is a floppy disk. 38 is an optical disk such as CD-ROM, DVD-ROM, etc.

For example, a program for performing a pattern extracting process is stored in a storage medium such as the hard disk 34, IC memory card 35, magnetic tape 36, floppy disk 37, optical disk 38, etc. Headline characters, etc. can be extracted from a document image of, for example, newspapers, magazines, etc. by reading a program, etc. for performing a pattern extracting process from the storage media to the RAM 23. Furthermore, a program, etc. for performing a pattern extracting process can be stored in the ROM 22.

Additionally, a program, etc. for performing a pattern extracting process can be retrieved from the communications network 25 through the communications interface 24. As the communications network 25 connected to the communications interface 24, a LAN (local area network), a WAN (wide area network), the Internet, an analog telephone network, a digital telephone network (ISDN (integral service digital network), a wireless communications network such as a PHS (personal handy system), satellite communications, etc. can be used.

When a program for performing a pattern extracting process is activated, the CPU 21 labels an input image read by the scanner 31, and generates an enclosing rectangle for connected elements assigned the same labels. Then, it checks the overlap level of each enclosing rectangle, and performs the overlapping nest integrating process on the enclosing rectangles overlapping each other at a high overlap level. Next, it groups the enclosing rectangles treated in the overlapping nest integrating process, extracts headline characters from among the grouping results, and outputs the extraction result on the display 28 or the printer 29.

FIG. 5 shows the operation of the character extraction apparatus according to the third embodiment of the present invention.

Figure 5A:
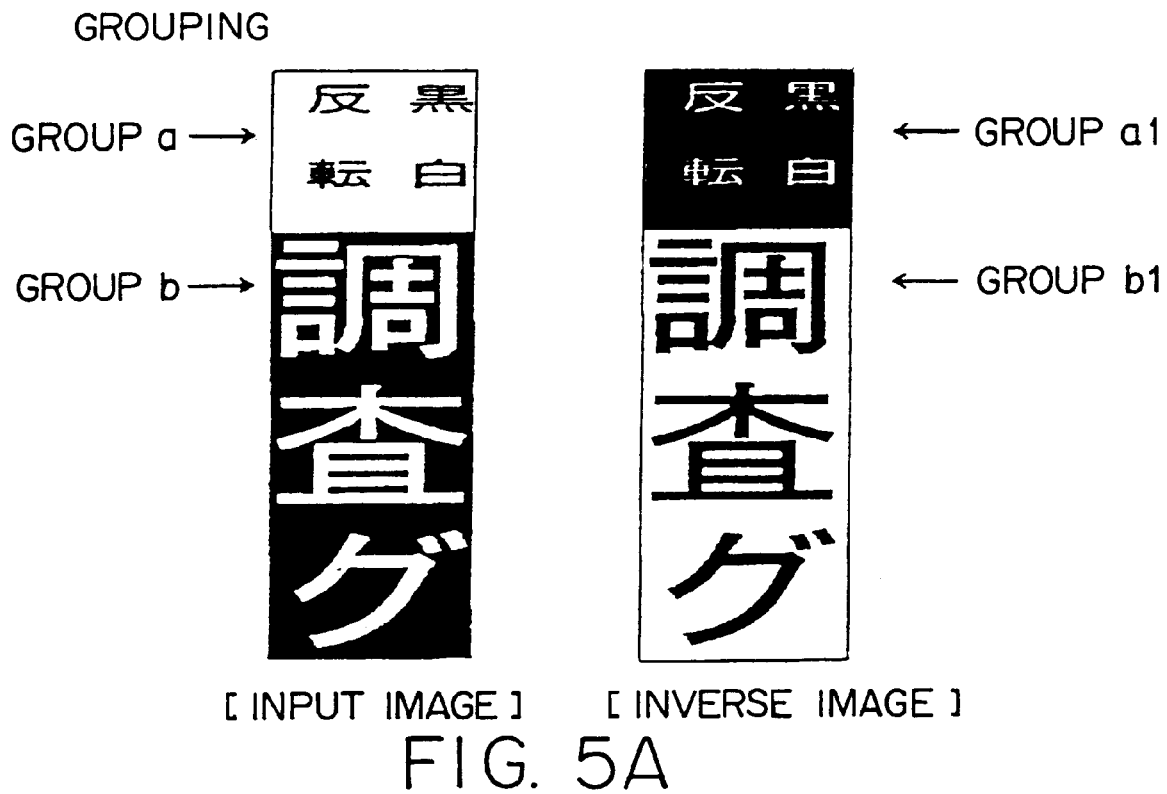
FIG. 5 shows the operation of the character extraction apparatus according to the third embodiment of the present invention.

In FIG. 5A, it is assumed that characters of black picture elements '黒白反転' arranged in two lines enclosed by a black character box, and white characters '調査グ' vertically arranged against the black background have been input as an input image, and that the character string '黒白反転' and the character string '調査グ' are extracted from the input image.

First, connected elements containing a series of picture elements of the same color are extracted from the input image based on the color of picture elements.

When the input image is a color image, the connected elements are extracted for each color. Since the input image shown in FIG. 5A is a black-and-white binary image, the connected elements containing black picture elements and white picture elements are extracted also from the black/white inverse image. The inverse image is obtained by exchanging the colors between the background of the input image and the characters as shown in FIG. 5A.

In the connected element extraction unit, a different label is assigned to each group of connected elements of black picture elements in the input image, and a different label is assigned to each group of connected elements of black picture elements in the black/white inverse image.

Then, in the input image and its inverse image, connected elements probably containing common character strings or character string groups based on the relative positions and the similarity in thickness among connected elements are grouped.

The similarity of connected elements in thickness refers to the ratio of the number of boundary picture elements to the total number of picture elements of connected elements. Common character strings or character string groups refer to a set of character strings representing the same meanings.

As a result, since the input characters '黒白反転' are close to each other and the same in thickness as shown in FIG. 5A, the characters '黒', '白', '反', and '転' are grouped as a group a. The character box enclosing the input image, that is, the characters '黒白反転' is connected by the black picture elements to the black picture element area corresponding to the background against the white characters '黒白反転'. Therefore, they are grouped as a group b.

Similarly, since the black picture element area corresponding to the background against the white characters '黒白反転' as an inverse image is connected by the black picture elements to the character box enclosing the characters '調査グ' they are grouped as a group a1. Since the characters '調査グ' as an inverse image are close to each other and the same in thickness, the characters '調', '査', and 'グ' are grouped as a group b1.

The group a is formed by relatively small characters against a white background area, and the group b is formed by relatively large white characters against a black background area. However, at first, the group b is not recognized as white characters against the black background. It is only recognized that the group a contains characters against a white background, and that the group b is blackish as a whole. Therefore, the character '調査グ' cannot be recognized even if a character recognizing process is performed on the background area formed by the black picture elements of the group b.

The group a1 is formed by relatively small white characters against a black background area, and the group b1 is formed by relatively large characters against a white background area. However, at first, the group b1 is not recognized as white characters against the black background. It is only recognized that the group a1 is blackish as a whole, and that the group b1 contains characters against the white background. Therefore, the characters '黒白反転' cannot be recognized even if a character recognizing process is performed on the background area formed by the black picture elements of the group a1.

After grouping the characters as described above, the character recognizing process is performed on each group. A sum of the inverse numbers of the distance values of the first character candidates of the characters obtained as the recognition results is defined as the character recognition level of the group. Therefore, if the character recognition level of a group is high, there is a strong possibility that the group is a character string to be extracted. The evaluation value of a group is obtained by weighting the character recognition level of a group by the area of the rectangular area enclosing the group.

Then, the evaluation value is obtained for the combinations of all groups to define the evaluation value of a combination. When groups are combined, only the groups whose rectangular areas enclosing the groups are not overlapping each other are associated, and all combinations of the groups whose rectangular areas enclosing the groups are not overlapping each other are obtained.

Figure 5B:
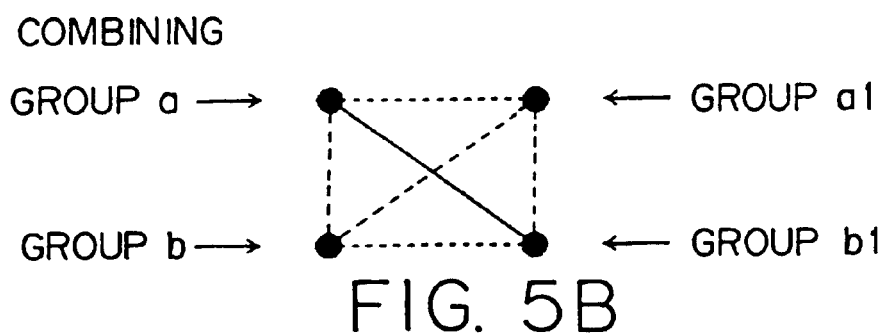

FIG. 5B shows the combination of groups whose rectangular areas enclosing the groups are not overlapping each other.

As shown in FIG. 5B, since the rectangular area enclosing the group a shown in FIG. 5A does not overlap the rectangular area enclosing the group b1, it can be combined with the group b1. However, since the rectangular area enclosing the group a overlaps the rectangular area of the group b or a1, the group a is not combined with the group b or a1.

On the other hand, since the rectangular area enclosing the group b overlaps any rectangular area enclosing the group a, a1, or b1, it cannot be combined with any of the groups a, a1, and b1.

Therefore, the combinations of the groups a and b, a and a1, b and a1, b and b1, and a1 and b1 are removed from all combinations. As a result, only the combination of the groups a and b1 remains. The combinations to be removed are indicated by the broken lines in FIG. 5B. The evaluation values are computed for all combinations of groups connected by solid lines. As a result, the combination of the group having the highest evaluation value is extracted as a character string.

Figure 5C:
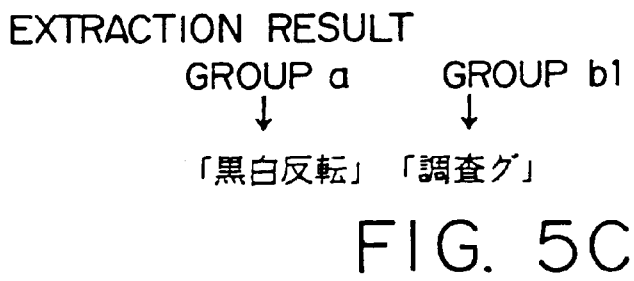

FIG. 5C shows a computation result.

In FIG. 5C, the combination of groups a and b is selected. After the character recognizing process is performed on the pattern extracted from the group a, the character string '黒白反転' is output. After the character recognizing process is performed on the pattern extracted from the group b1, the character string '調査グ' is output.

If the character recognizing process is performed on the group b, then the character string '調査グ' cannot be correctly recognized because the group b is formed by the character box enclosing the characters '黒白反転' which is an input image, and the black picture element area corresponding to the background against the white characters '調査グ'

Therefore, if the recognizing process is performed using only the pattern extracted from the is input image shown in FIG. 5A, then the character string '黒白反転' can be extracted, but the character string '調査グ' cannot be extracted.

If the character recognizing process is performed on the group a1, then the character string '調査グ' cannot be correctly recognized because the group a1 is formed by the black picture element area corresponding to the background against the white characters '黒白反転' which is an inverse image, and the character box enclosing the characters '調査グ'.

Therefore, if the recognizing process is performed using only the pattern extracted from the inverse image shown in FIG. 5A, then the character string '調査グ' can be extracted, but the character string '黒白反転' cannot be extracted.

On the other hand, according to the fifth embodiment of the present invention, the character recognizing process is performed using both the pattern extracted from the input image and the pattern extracted from the inverse image. The character string '黒白反転' is extracted from the input image while the character string '調査グ' is extracted from the inverse image. Therefore, both the character strings '黒白反転' and '調査グ' can be correctly extracted.

FIG. 6 is a block diagram showing the configuration of the character extraction apparatus according to the third embodiment of the present invention.

In FIG. 6, a character string extraction apparatus 41 comprises a connected element extraction unit 42, a grouping unit 43, a character recognition unit 44, a combination evaluation unit 45, and a character string extraction unit 46.

The connected element extraction unit 42 extracts connected elements containing a series of picture elements of the same color based on the color of the picture elements in the input image. If the input image is a color image, then connected elements are extracted for each color. If the input image is a monochrome binary image, then black and white picture elements of the connected elements in an inverse image are also extracted for each color.

The grouping unit 43 groups connected elements which possibly have common character strings or character string groups based on the relative positions between the connected elements and the similarity in thickness of connected elements.

The character recognition unit 44 performs the character recognizing process for each group and obtains the character recognition level of a group. The combination evaluation unit 45 obtains an evaluation value of a group, and then obtains an evaluation value of a combination. The character string extraction unit 46 extracts as a character string a combination of groups having the highest evaluation value of a combination.

Thus, the character string extraction apparatus 41 shown in FIG. 6 groups connected elements based on the similarity, performs the character recognizing process for each group, assigns a character string level to each group, and extracts a combination of consistent groups. Therefore, a character string can be extracted from a complicated image such as a background pattern containing black and white picture elements, a color document, etc.

Furthermore, the character string extraction apparatus 41 shown in FIG. 6 and the storage medium do not determine a color during the extracting process, do not assume a character string area, or do not determine the line width of a standard character in the extracting process, thereby improving the precision in extraction of character string.

The character string extraction apparatus 41 according to the third embodiment of the present invention is described in detail by referring to the attached drawings. As an embodiment of the character string extraction apparatus 41, a character string is extracted from a monochrome binary image such as a headline of newspapers, etc.

FIG. 7 is a flowchart showing the operation of the character extraction apparatus according to the third embodiment of the present invention.

In FIG. 7, an image is input in step S1, and control is passed to step S2. In step S2, a white/black inverse image is generated against the input image. Then, an input image process and an inverse image process are concurrently performed. When the input image process is performed, control is passed to step S3. When the inverse image process is performed, then control is passed to step S6.

When the input image and its inverse image are obtained, a labelling process is performed to obtain respective connected elements. In step S3, a labelling process is performed on the input image. In step S6, a labelling process is performed on the inverse image.

After the labelling process for the input and inverse images, the respective connected elements are grouped. As shown in FIG. 7, the connected elements of the input image are grouped in step S4, and the connected elements of the inverse image are grouped in step S7.

After the grouping process for the input and inverse images, the character recognizing process is performed on both groups. The character recognizing process is performed on the groups of the input image in step S5, and the character recognizing process is performed on the groups of the inverse image in step S8.

After the character recognizing process on the input and inverse images, control is passed to step S9. In step S9, groups having enclosing rectangular areas overlapping each other are removed from the combinations of groups, and the consistent combinations are all counted.

In step S10, each of the candidates for combinations is evaluated based on the evaluation value. The evaluation value of each group is a function between the character recognition level of each group and the area of the rectangular area enclosing each group. The evaluation value of a combination is obtained by combining the evaluation values of groups in a consistent combination.

Then, in step S1, a character string corresponding to the group having the highest evaluation value is extracted, and the process terminates.

Figure 8:
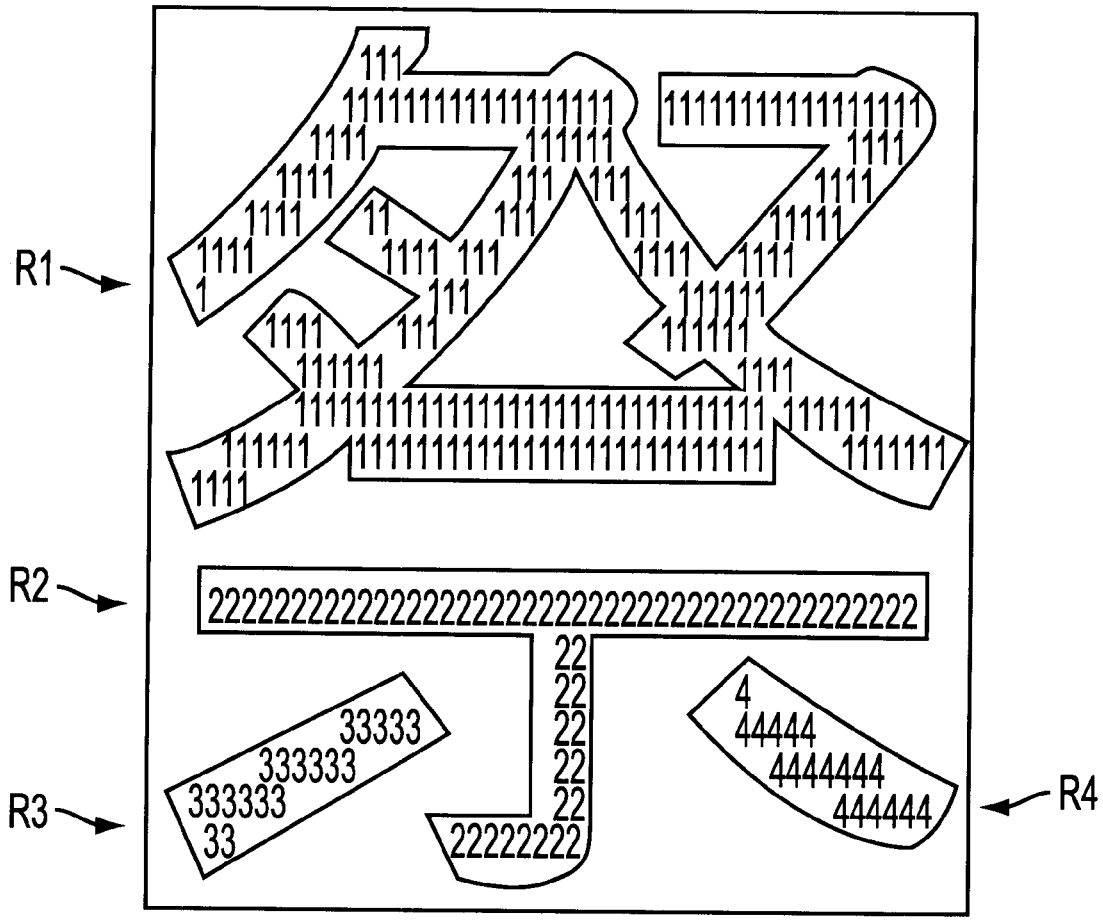
FIG. 8 shows the labelling process according to an embodiment of the present invention.

FIG. 8 shows the labelling process according to an embodiment of the present invention.

In FIG. 8, a white character '祭' against the black background contains four connected elements R1 through R4 respectively assigned the numbers 1 through 4. Thus, identifying connected elements formed by a series of picture elements of the same color (white picture elements in FIG. 4) by numbers, etc. as shown in FIG. 8 is referred to as 'labelling'.

Figure 9:
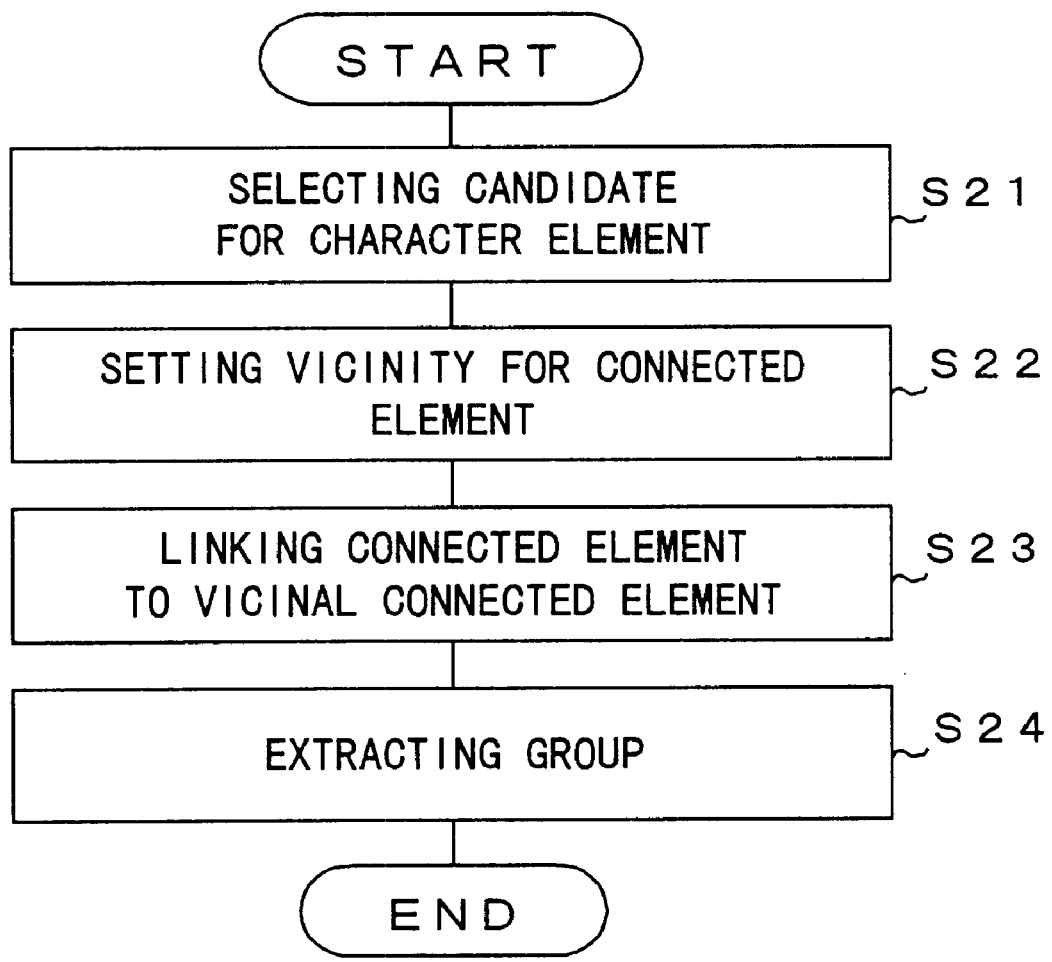
FIG. 9 is a flowchart showing the grouping process according to an embodiment of the present invention.

FIG. 9 is a flowchart showing the grouping process according to an embodiment of the present invention.

In FIG. 9, a candidate for a character element is selected in step S21. In step S21, target connected elements are limited. In this example, connected elements whose enclosing rectangle is equal to or smaller than a standard size are removed to be set as those not to be processed in the subsequent process because they cannot be candidates for character elements. Then, control is passed to step S22.

In step S22, the vicinity of connected elements is set. The vicinity refers to an area formed by encompassing the enclosing rectangle of connected elements by a frame of an approximate size. When a part of a connected element is in the vicinity of another connected element, it is referred to as a vicinal connected element. Then, control is passed to step S23.

In step S23, the connected element is linked to its vicinal connected element. Linking refers to associating a connected element with its vicinal connected element after determining whether the connected element and its vicinal connected element belong to the same character string or the same character string group.

Connected elements are linked based on the relative position and similarity in thickness of the connected elements. The relative position and similarity in thickness of the connected elements are referred to as familial similarity of the connected elements. The familial similarity of all connected elements and all vicinal connected elements is determined in step S23, and control is passed to step S24.

In step S24, a connected element linked with its vicinal connected element is extracted as a group.

The connected elements are linked in various methods. For example, connected elements A, B, and C are linked, but the connected elements A and C may not be directly connected. Similarly, the connected element A is linked to the connected element B, but the connected element B may not be linked to the connected element A.

The connected elements forming the above described link is referred to as connected elements of arch connection. In step S24, a set of connected elements linked for arch connection is retrieved as a group.

Figure 10:
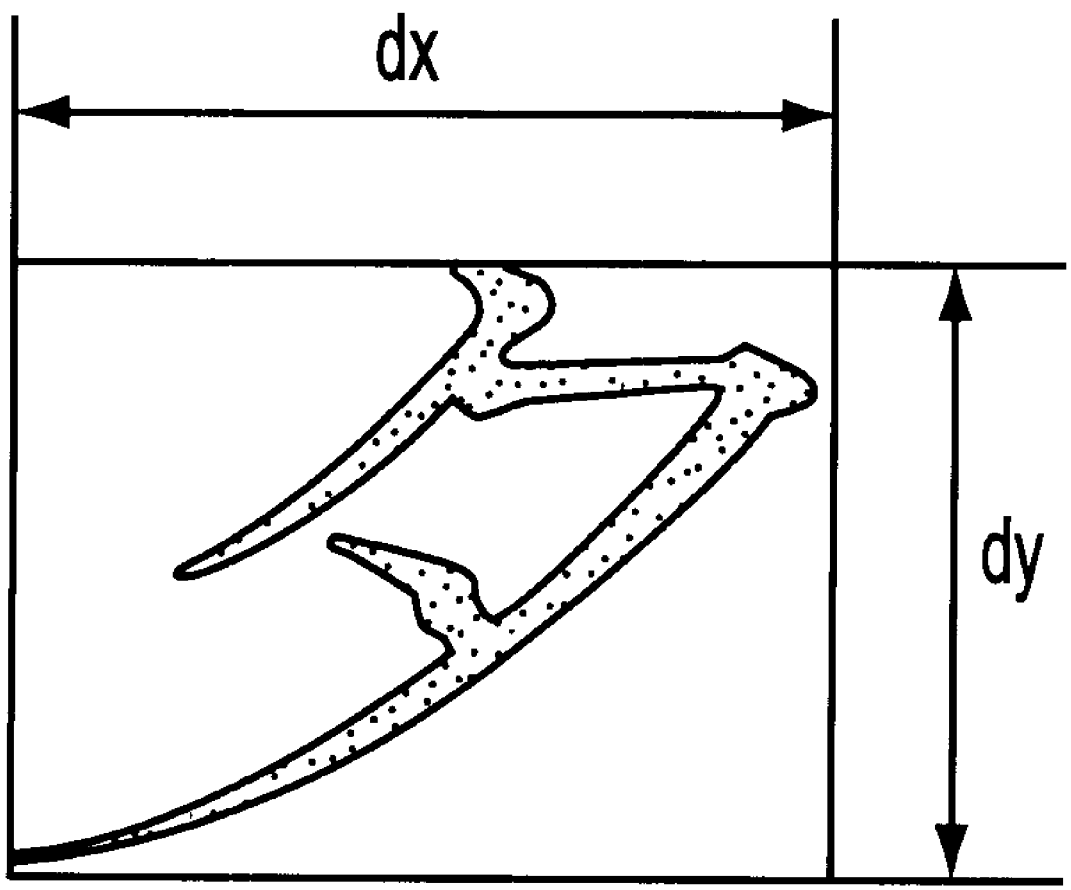
FIG. 10 shows an example of connected elements and enclosing rectangles according to an embodiment of the present invention.

FIG. 10 shows an example of connected elements and their enclosing rectangle according to an embodiment of the present invention.

In FIG. 10, the character 'タ' is a connected element, and its enclosing rectangle is dx in length in the x direction and dy in the y direction.

Figure 11:
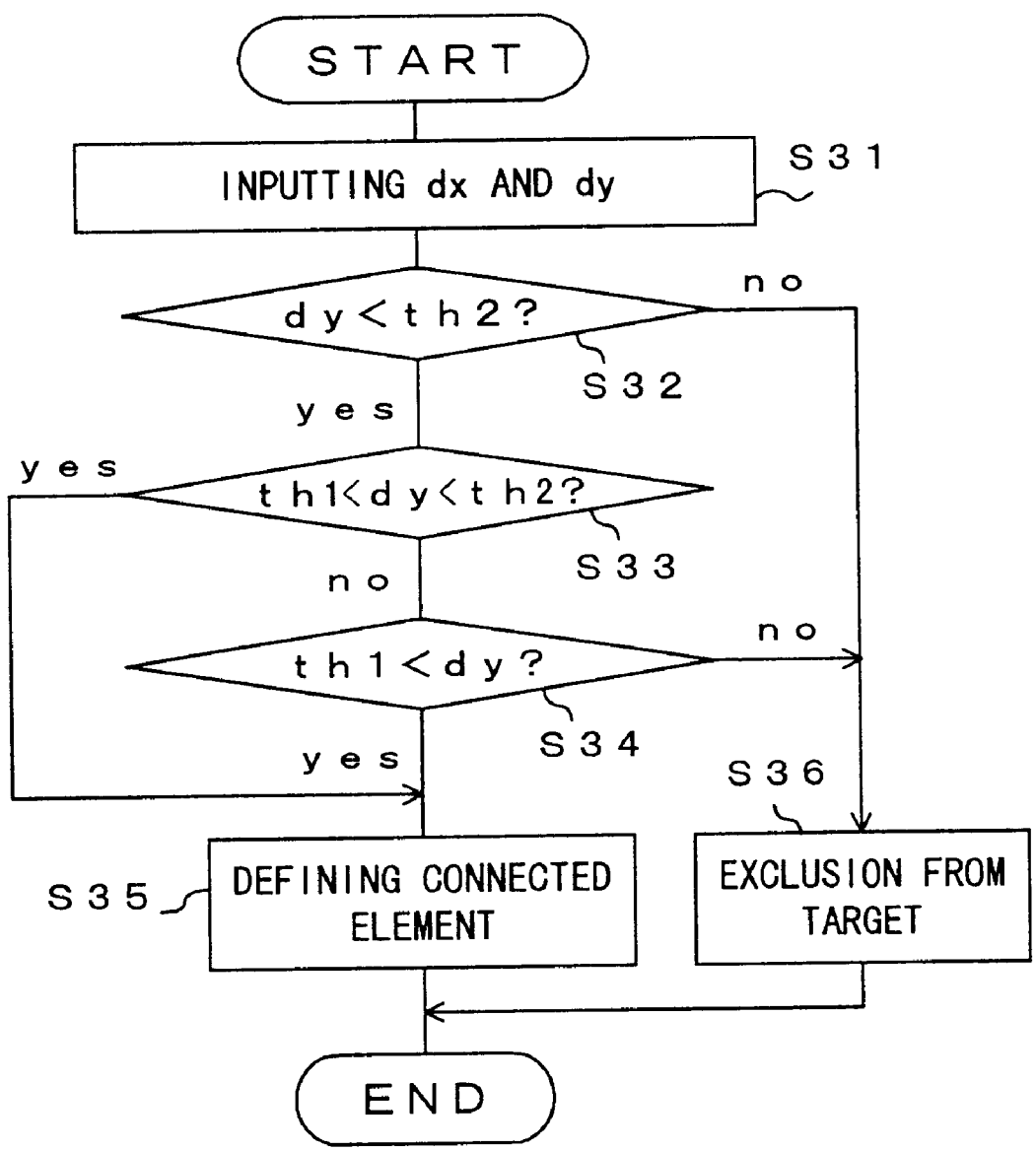
FIG. 11 is a flowchart showing the method of limiting the connected elements according to an embodiment of the present invention.

FIG. 11 is a flowchart showing the method of limiting the target connected elements according to an embodiment of the present invention.

In FIG. 11, the threshold of the length dx in the x direction and the threshold of the length dy in the y direction of the enclosing rectangle of the connected elements are set to th1 through th2. When the length dy in the x direction and the length dy in the y direction are input in step S31 shown in FIG. 11, it is determined in step S32 whether or not the length dy in the y direction is smaller than the threshold th2.

In step S32, control is passed to step S33 if the length dy in the y direction is smaller than the threshold th2, and control is passed to step S36 if the length dy in the y direction is not smaller than the threshold th2. In step S33, control is passed to step S35 if the length dx in the x direction is larger than the threshold th1 and smaller than the threshold th2, and control is passed to step S34 if the length dx in the x direction is equal to or smaller than the threshold th1 or equal to or larger than the threshold th2.

In step S34, control is passed to step S35 if the length dy in the y direction is larger than the threshold th1, and control is passed to step S36 if it is not larger than the threshold th1.

It is assumed in step S35 that the corresponding connected element can be defined as a candidate for a character element. It is assumed in step S36 that the corresponding connected element is not to be processed in the subsequent steps, thereby terminating the process.

Figure 12:
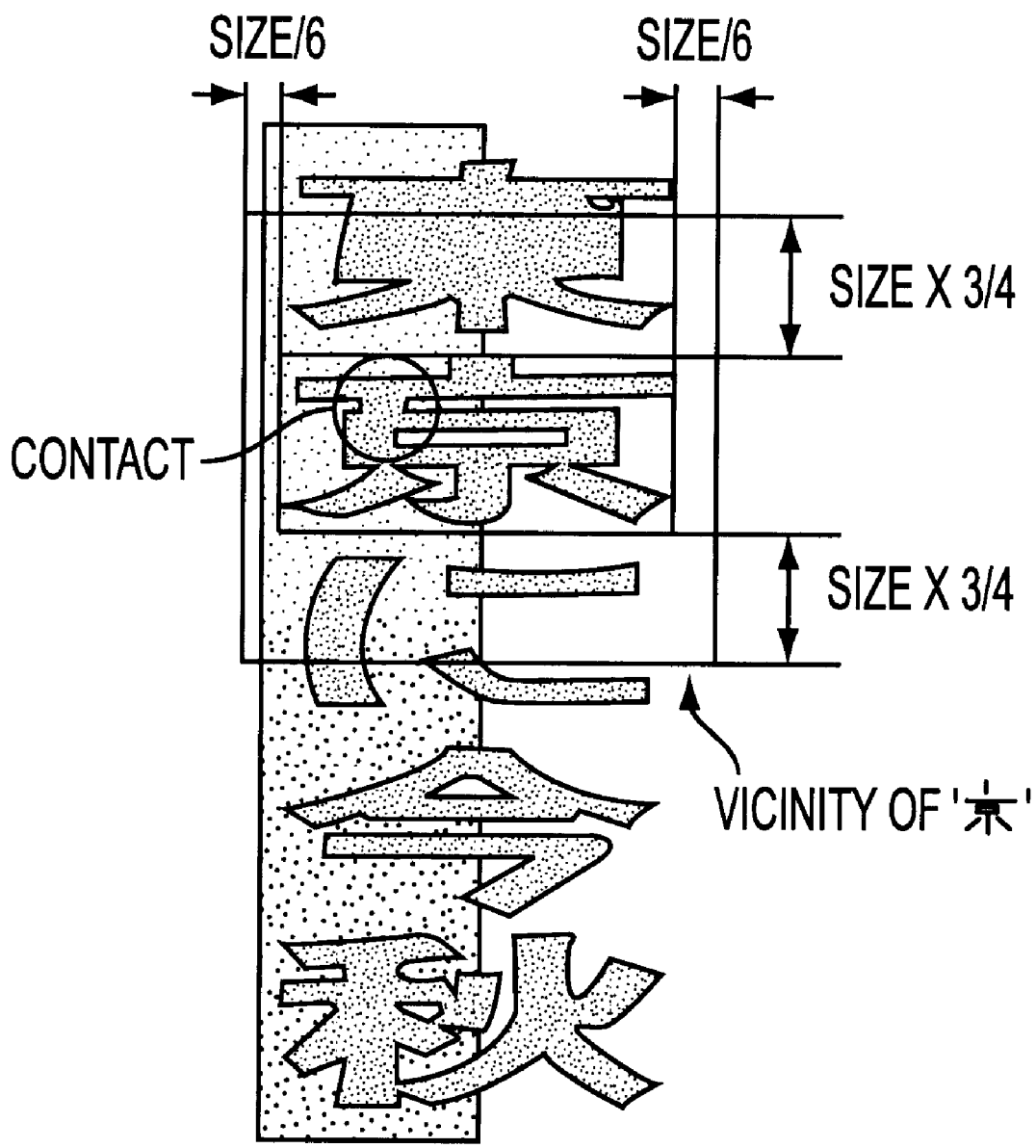
FIG. 12 shows the vicinity of the connected elements according to an embodiment of the present invention.

FIG. 12 shows the vicinity of connected elements according to an embodiment of the present invention.

In FIG. 12, the vicinity is an area formed when the circumference of the enclosing rectangle of connected elements is encompassed by a frame of an appropriate size.

An appropriate size indicates, as shown in FIG. 11, the space of ⅙ of the width of the character on both sides, and the space of ¾ of the height of the character above and below the character if the characters are vertically printed. Similarly, the vicinity can be defined for horizontally printed characters.

In FIG. 12, assuming that the vicinity of the character '京' is set, the vicinity of '京' includes a part of the characters '東' and the character 'に'. Therefore, it is determined that the vicinal connected elements of the character '京' are the characters '東' and 'に'.. The half of the background area of '東京に 今秋' shown in FIG. 11 contains large and small dots forming a net pattern. Since the characters '京' looks connected at the portion encompassed by the circle, the character '京' is assumed to be a connected element.

Assuming that the character '京' is not connected at the portion encompassed by the circle in FIG. 12, the character '京' comprises the top element and the other three connected elements. Relating to the vicinity of each of the connected elements, the connected elements are checked for each size.

Figure 13:
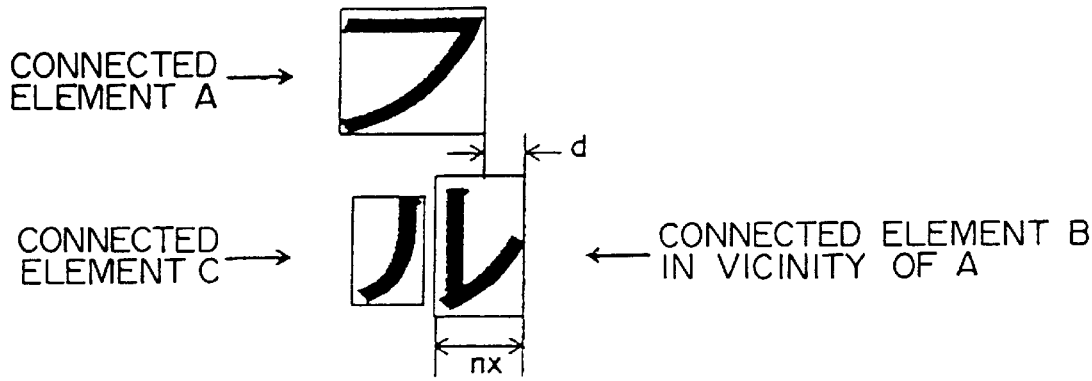
FIG. 13 shows the familial similarity of the connected elements according to an embodiment of the present invention.

FIG. 13 shows the familial similarity of the connected elements related to an embodiment of the present invention.

In FIG. 13, the familial similarity of the connected element depends on the relative positions between the connected elements and the difference in average thickness between the connected elements. The average thickness is represented by the ratio of the number of boundary picture elements to the total number of picture elements of the connected elements, that is, (number of boundary picture elements/total number of picture elements).

Assuming that, in FIG. 13, the relative positions between the connected element A and its vicinal connected element B are represented by d and nx, and the average thicknesses of the connected element A and its vicinal connected element B are respectively ta and tb, the familial similarity of the vicinal connected element B to the connected element A is represented by the following equation.

Familial similarity of vicinal connected element B to connected element $A = d/nx + 0.1 \times \max(ta, tb)/\min(ta, tb)$ where d indicates the length of the portion of the element nx of the vicinal connected element B in the x direction outside the connected element A.

The familial similarity of the vicinal connected element B to the connected element A shown in FIG. 13 is as high as the familial similarity of the connected element C to the connected element B. Therefore, it is determined that the connected elements A, B, and C belong to the same character string. In this example, the familial similarity of the connected element C to the connected element B is considered only in element of thickness.

Figure 14:
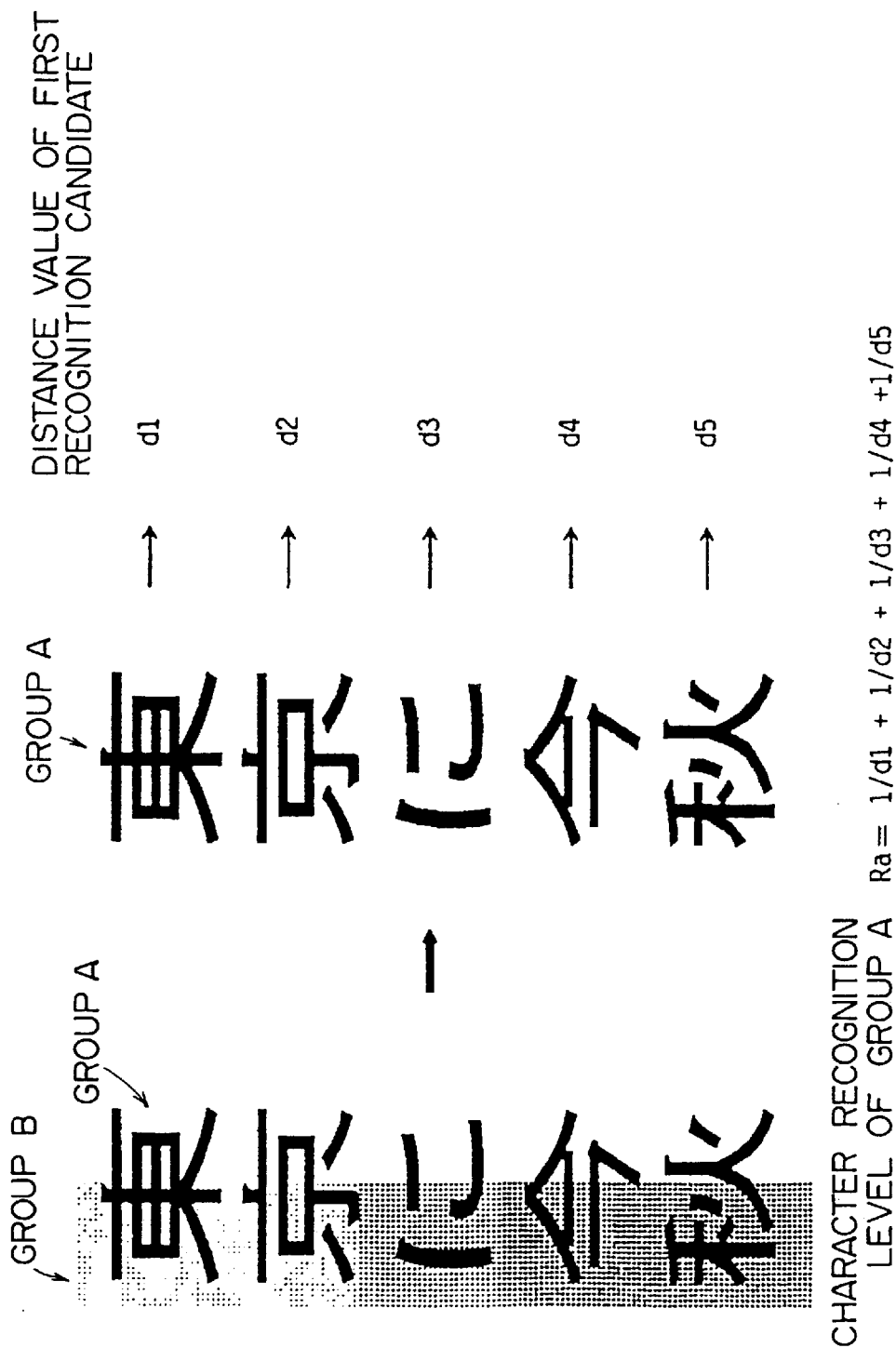
FIG. 14 shows the method of computing the character recognition level of a group according to an embodiment of the present invention.

FIG. 14 shows the method of computing the character recognition level of a group according to an embodiment of the present invention. In FIG. 14, the character recognition level of a group is represented by a sum of the inverse numbers of the distance values of the first character candidates of the character recognition results after performing a character recognizing process for each group. If a character has a small distance value, it means that the character has a high recognition level.

Assuming that the character string '東京に今秋' is a group A, and the distance values of the first recognition candidates of the characters '東','京','に','今', and '秋' are respectively d1, d2, d3, d4, and d5 as shown in FIG. 14, the character recognition level Ra of the group A is represented by the following equation.

$$Ra=1/d1+1/d2+1/d3+1/d4+1/d5$$

When target connected elements are limited, there is a strong possibility that the net pattern by dots as the background area against the character string '東京に今秋' shown in FIG. 14 is not processed in the subsequent steps only if the pattern is formed by complete dots. If the network pattern is formed as connected dots, it is classified as a group B. It is predicted that both the group B and the group of an inverse image of the net pattern by dots have the character recognition level of 0. Since the net pattern of the group B overlaps the group A comprising the character string '東京に今秋' the group B is not output after being combined with the group A.

Figure 15:
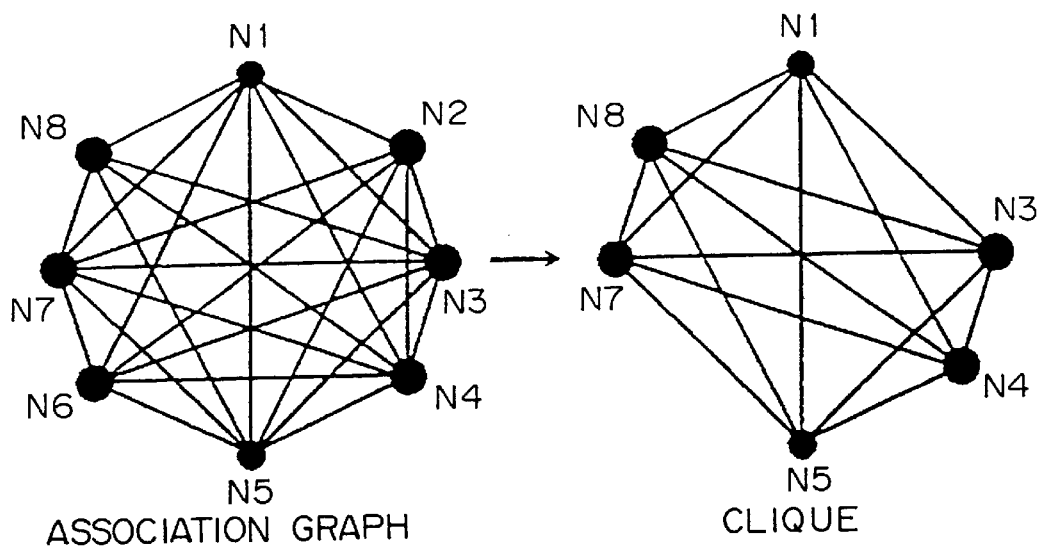
FIG. 15 shows an association graph and clique according to an embodiment of the present invention.

FIG. 15 shows an association graph and a clique according to an embodiment of the present invention.

In FIG. 15, the groups are associated if their rectangular areas do not overlap each other. The concept of an association graph and a clique is used to obtain all combinations of groups whose rectangular areas do not overlap each other.

That is, an association graph is generated to count consistent combinations, and all cliques, that is, complete graphs, are obtained so that the groups whose rectangular areas overlap each other can be removed from the combination of groups.

The association graph shown in FIG. 15 is generated, with groups defined as nodes, by connecting via paths (solid lines) the nodes corresponding to the groups whose rectangular areas do not overlap each other. In the association graph, the nodes corresponding to the groups whose rectangular area overlap each other are not connected through paths.

A clique refers to combinations of consistent nodes. A plurality of cliques are generated from the association graph, and each clique is a complete graph in which all nodes are connected through paths. All combinations of consistent groups can be obtained by obtaining cliques from the association graph.

Thus, a combination between the group A and the group B shown in FIG. 14 cannot be set even if the provisionally set group B (net pattern) and the group '東京に今秋' are individually recognized.

As described above, the evaluation value of a combination of consistent groups can be obtained. As a result of the evaluation, for example, a net pattern as a background area, spots, etc. can be removed from the targets to be processed.

For example, assuming that an association graph comprising nodes N1 through N8 are generated as shown in FIG. 15, a complete graph is obtained such that paths are connected from each node to all other nodes. For example, since a node N1 is connected to all other nodes N2 through N8 through paths, the node N1 is a node of the clique. Since the node N2 is not connected to the node N8, the node N2 is removed from the nodes of the clique. Since the node N3 is connected to all other nodes N1, N2, and N4 through N8 through paths, the node N3 is a node of the clique. Since the node N4 is connected to all other nodes N1 through N3, and N5 through N8 through paths, the node N4 is a node of the clique. Since the node N5 is connected to all other nodes N1 through N4 and N6 through N8 through paths, the node N5 is a node of the clique. Since the node N6 is not connected to the node N8, the node N6 is removed from the nodes of the clique. Since the node N7 is connected to all other nodes N1 through N6 and N8 through paths, the node N7 is a node of the clique. Since the node N8 is connected to all other nodes N1 through N7, the node N8 is a node of the clique.

As a result, the clique comprising the nodes N1, N3, N4, N5, N7, and N8 can be extracted. By extracting a clique from an association graph, only the groups whose rectangular areas do not overlap each other can be efficiently extracted.

FIG. 16 is a flowchart showing the method of extracting groups whose connected elements do not overlap each other according to an embodiment of the present invention.

In FIG. 16, it is determined whether or not each group is related to all other groups (step S41), and an association graph is generated (step S42). Then, a clique is extracted from an association graph (step S43), and consistent combinations in combinations of groups extracted from input images and groups extracted from inverse images are defined (step S44).

FIG. 17 shows the method of linking the connected elements according to an embodiment of the present invention.

In FIG. 17A, assume that the white characters '水道メーター' against the black background, and the characters '談合解明' comprising black picture elements are input, and that a connected element R11, which is a part of the character '談', and the connected elements linked to the connected element R11 are extracted.

In this case, as shown in FIG. 17B, the enclosing rectangle G1 of the connected element R11 is generated, and the vicinity B1 of the connected element is set around the enclosing rectangle G1. When the vicinity B1 of the connected element is set, the connected elements R12 through R20 partly or completely overlaps the vicinity B1 of the connected element are extracted as shown in FIG. 17C. When the connected elements R12 through R20 are extracted, the familial similarity between the connected element R11 and the connected elements R12 through R20 is checked as shown in FIG. 17D. Since the connected element R12 is quite different from the connected element R11 in thickness, the connected element R12 is removed from targets to be linked to the connected element R11. As a result, the connected elements R13 through R20, that is, the connected elements excluding the connected element R12, are linked to the connected element R11.

FIG. 18 shows examples of groups which can be or cannot be defined as cliques.

In FIG. 18A, the characters '水道メーター' in the original image are the same in thickness and arranged closely to each other. Therefore, the characters are classified as a group 1. Since the black picture element area corresponding to the background against the white characters '談合解明' in the original image are connected to each other by the black picture elements, the area is classified as a group 2.

Since the black picture element area corresponding to the background against the white characters '水道メーター' in the inverse image are connected to each other by the black picture elements, the area is classified as a group a. Since the characters '談合解明' in the inverse image are the same in thickness and arranged closely to each other, the characters are classified as a group b.

Next, since the rectangular areas of the groups 1 and b do not overlap each other as shown in FIG. 18C, the groups 1 and b are considered to form a clique, and a consistent combination. Furthermore, since the rectangular areas of the groups 1 and a overlap each other as shown in FIG. 18D, the groups 1 and a are considered not to form a clique, and to be an inconsistent combination.

Thus, as shown in FIG. 18B, the group 1 makes a consistent combination with the group b or the group 2, but does not make a consistent combination with the group a. The group 2 makes a consistent combination with the group 1 or the group a, but does not make a consistent combination with the group b. The group a makes a consistent combination with the group 2 or the group b, but does not make a consistent combination with the group 1. The group b makes a consistent combination with the group 1 or the group a, but does not make a consistent combination with the group 2.

Figure 19:
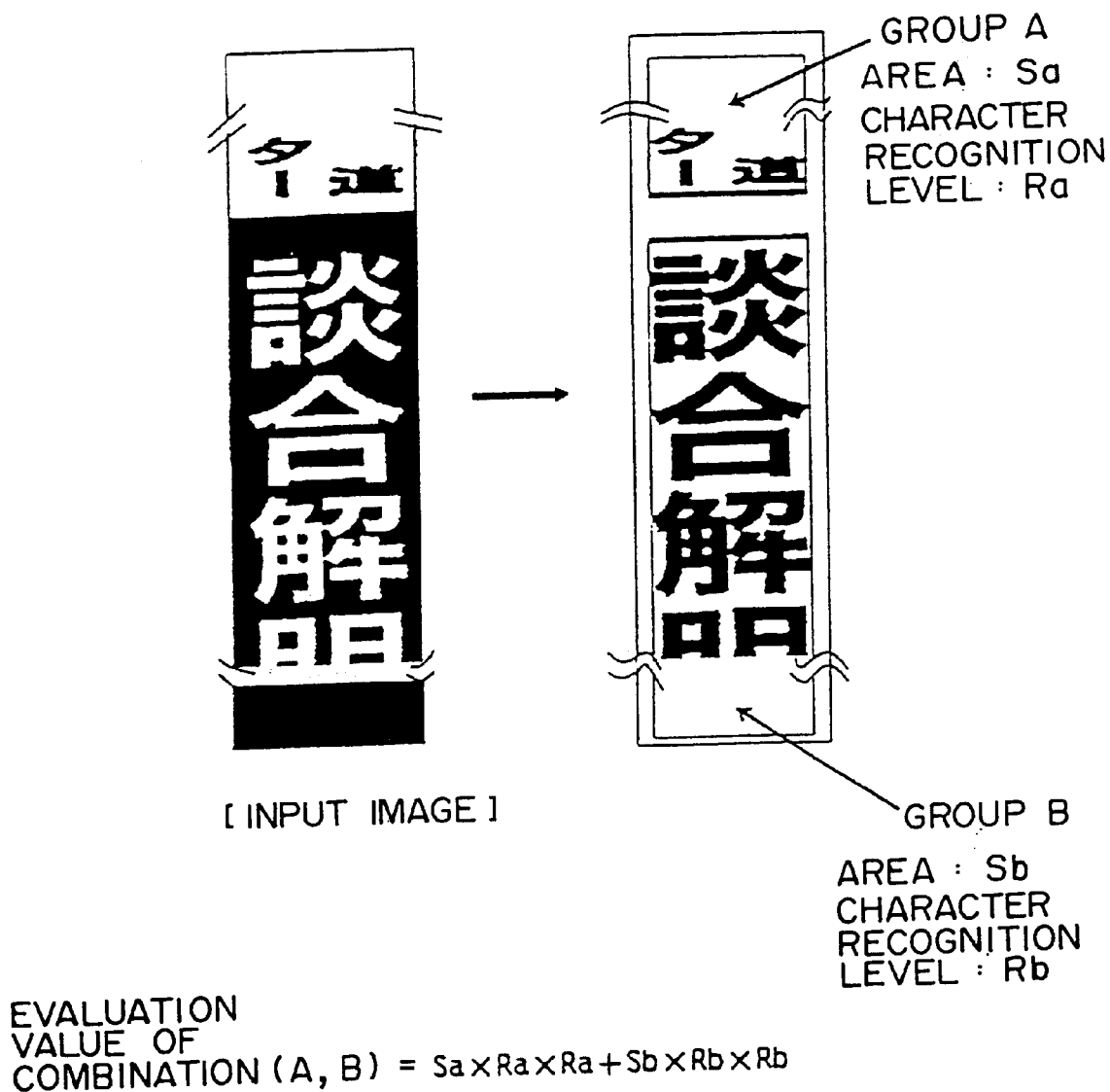
FIG. 19 shows the method of computing the evaluation value of a combination according to an embodiment of the present invention.

FIG. 19 shows the method of computing the evaluation value of the combination according to an embodiment of the present invention.

In FIG. 19, the evaluation value of a combination is obtained by combining the evaluation values of groups, that is, the factors of the character recognition levels of groups and the areas of the rectangular areas of respective groups of consistent combinations.

For example, assume that a combination of the groups A and B is obtained from the input image shown in FIG. 19 as a combination of consistent groups. Assuming that the area of the rectangular area of the group A is Sa, the character recognition level of a group is Ra, the area of the rectangular area of the group B is Sb, and the character recognition level of a group is Rb, the evaluation value of the combination of the groups A and B can be computed by the following equation.

Evaluation value of combination (A, B)=Sa×Ra×Ra+Sb×Rb×Rb

According to the present embodiment, a monochrome image has been described above. However, the present embodiment is not limited to a monochrome image, but can be widely applied to color characters and backgrounds by replacing the monochrome picture elements with the chromaticity, the brightness, and the density.

In the present embodiment, vertically printed characters are exemplified. However, it is obvious that the present invention can be applied not only to vertically printed characters, but also vertically and horizontally printed characters.

Described below is the pattern extraction apparatus according to the fourth embodiment of the present invention.

According to the fourth embodiment of the present invention, the connected element overlap nest integrating process is omitted to avoid integrating the entire image. Additionally, a part of a drawing or a photograph which may cause an undesired influence when a headline area is extracted is absorbed and integrated into a larger rectangle to reduce the influence. Normally, a rectangle comprising a part of a drawing or a photograph often overlap another rectangle. This is a clue to retrieving these rectangles. Then, the overlap related to a headline rectangle is computed. It is determined that a value higher than a predetermined threshold indicates a rectangle formed by a part of a drawing or a photograph, and the rectangle is processed in the overlap nest integrating process.

To estimate a correct text character size when the overlap nest integrating process is omitted, a histogram which relates to the size of an enclosing rectangle of a connected element, and is weighted by the frequency and the area of a rectangle is used. Thus, even if a part of a character is counted as is, and the number of rectangles smaller than an actual text character is the largest, it is not the largest number in a new histogram because of the weight of area. Therefore, the size of a rectangle smaller than an actual text character is not defined as the size of an estimated character. On the other hand, even if there is a large connected element, the frequency of the larger element is lower. Therefore, the size of a rectangle larger than an actual text character is not defined as an estimated character size.

The fourth embodiment of the present invention is described below by referring to an example of a binary monochrome image.

Figure 20:
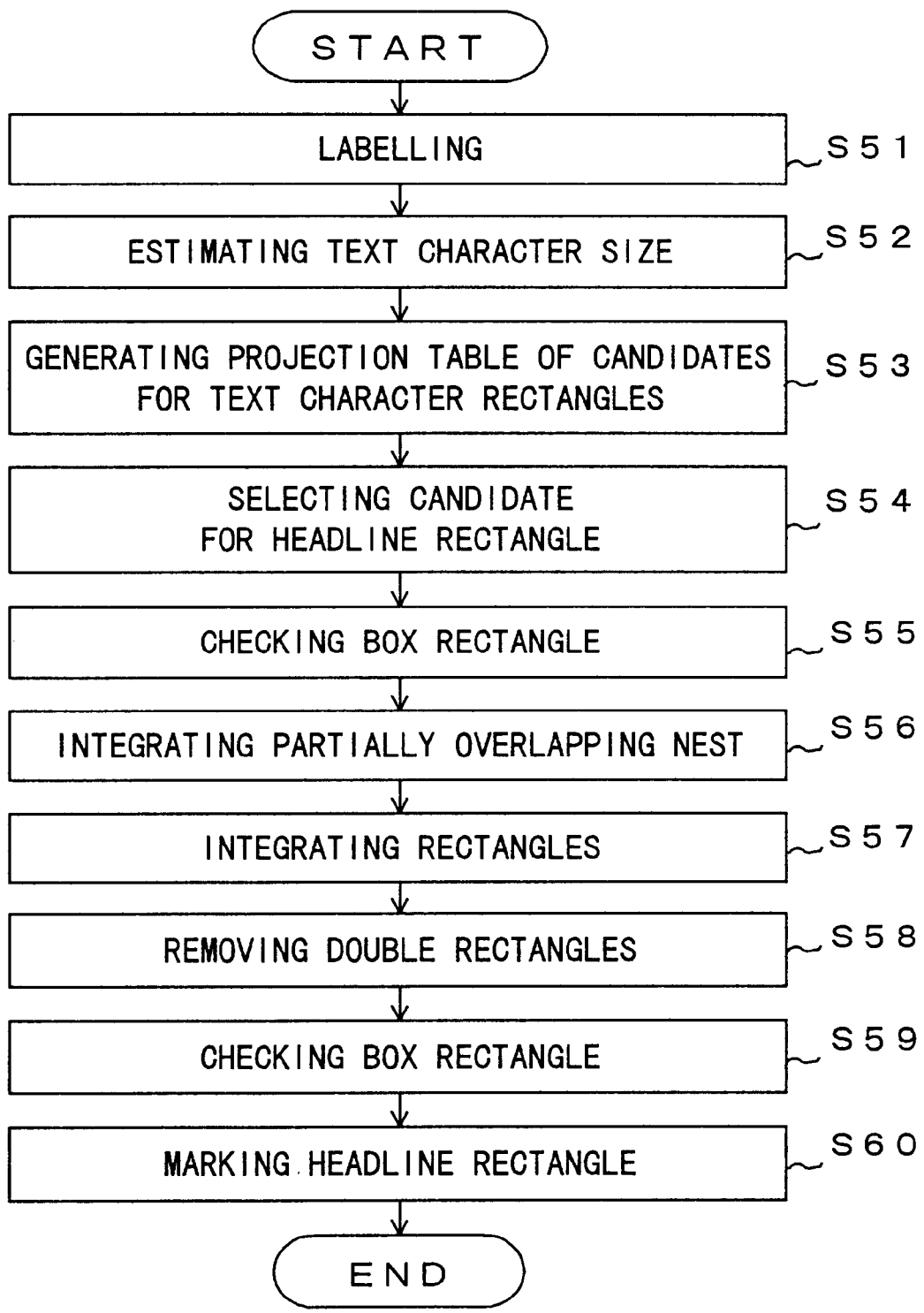
FIG. 20 is a flowchart showing the operations of the pattern extraction apparatus according to the fourth embodiment of the present invention.

FIG. 20 is a flowchart showing the operation of the pattern extraction apparatus according to the fourth embodiment of the present invention.

In FIG. 20, the labelling process is. performed on an input image (step S51). The coordinate information about the enclosing rectangle of each connected element is obtained in the labelling process.

Next, the size of a text character is estimated (step S52). In estimating the size of a text character, a histogram relating to the size of the enclosing rectangle of a connected element is generated. The histogram is weighted by the frequency and the area of a rectangle. Practically, assuming that the width and the height of a connected element are respectively dx and dy, the histogram of the larger is adopted. The following transformation is performed on each value H (i) of the obtained histogram to generate a new histogram H'.

H'(i)=H(i)×H(i)×i×i (where i indicates the size of a rectangle.)

In this new histogram, the point indicating the maximum histogram value refers to the text character size.

FIG. 21 shows an example of a histogram for obtaining the size of an enclosing rectangle according to an embodiment of the present invention.

Figure 21A:
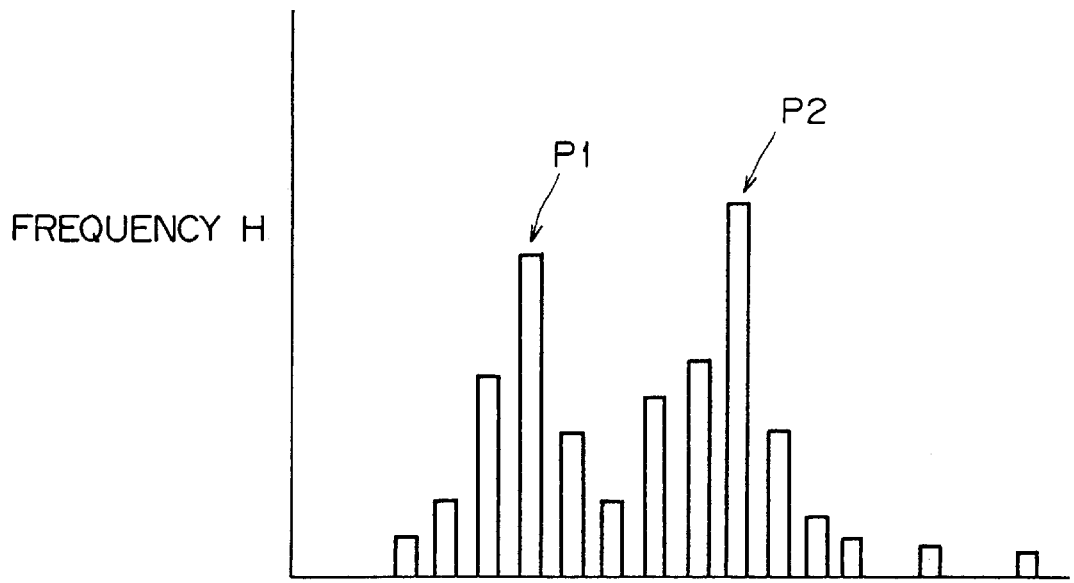
FIG. 21 shows an example of a histogram for obtaining the size of the enclosing rectangle according to an embodiment of the present invention.

In FIG. 21A, when a histogram showing the frequency H of the size of an enclosing rectangle is generated without performing the overlap nest integrating process, the peak P2 corresponding to the size of a text character is generated, and the peak P1 corresponding to the size of the enclosing rectangle of a part of a character before integration can also be generated.

Therefore, when the text character size is estimated using the histogram, the size of the enclosing rectangle corresponding to the peak P1 may be estimated as the text character size. Thus, the text character size may be mistakenly estimated.

Figure 21B:
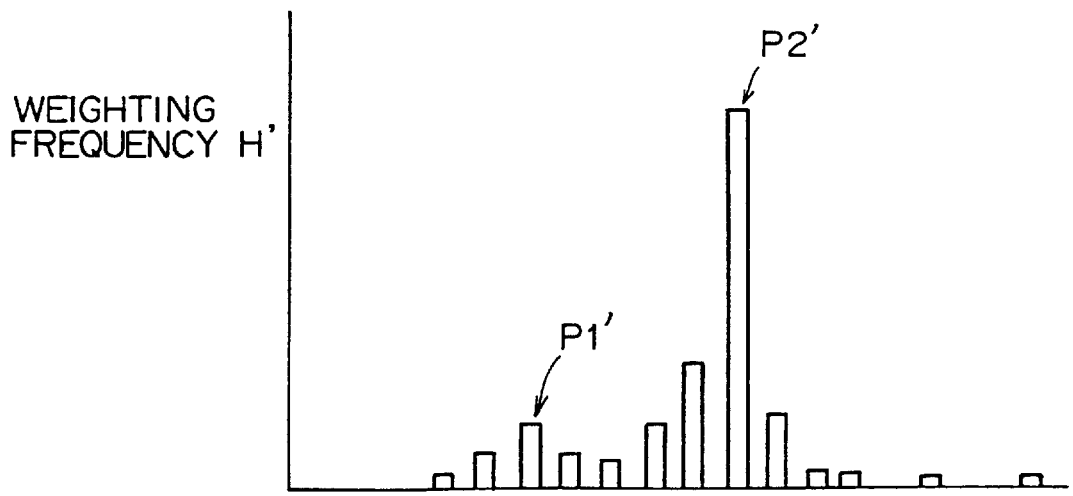

On the other hand, if the histogram shown in FIG. 21A is weighted by the size of the enclosing rectangle in FIG. 21B, the histogram value H of the peak P1 indicating a small enclosing rectangle is smaller than the histogram value H of the peak P2 indicating a large enclosing rectangle. As a result, using the histogram shown in FIG. 21B, it is possible to estimate the value of the peak P2' corresponding to the size of the text character to be larger than the value of the peak P1' corresponding to the size of the enclosing rectangle of a part of the character before integration. Thus, mistakenly estimating the size of the enclosing rectangle corresponding to the peak P1' as the text character size can be avoided. As a result, the text character size can be correctly estimated.

Next, the projection table of text character rectangle candidates is generated (step S53).

In generating the projection table, a text character rectangle candidate is selected from all rectangles. Practically, assuming that the width of a connected element is dx, the height of the connected element is dy, the size of the text character is c, and the threshold is α, a rectangle satisfying the following equation is defined as a candidate for a text character rectangle.

$$|\max(dx, dy)-c|<\alpha$$

Then, relating to the x and y coordinate axes of the entire image, a projection of a candidate for a text character rectangle is made. That is, when the number of the candidate for a text character rectangle is n, and the coordinates of the upper left point and the lower right point of the rectangle are respectively (x1, y1) and (x2, y2), the number n is stored in the range from x1 to x2 along the x coordinate axis and in the range from y1 to y2 along the y coordinate axis. Thus, a projection table for a candidate for a text character rectangle is generated.

Figure 22:
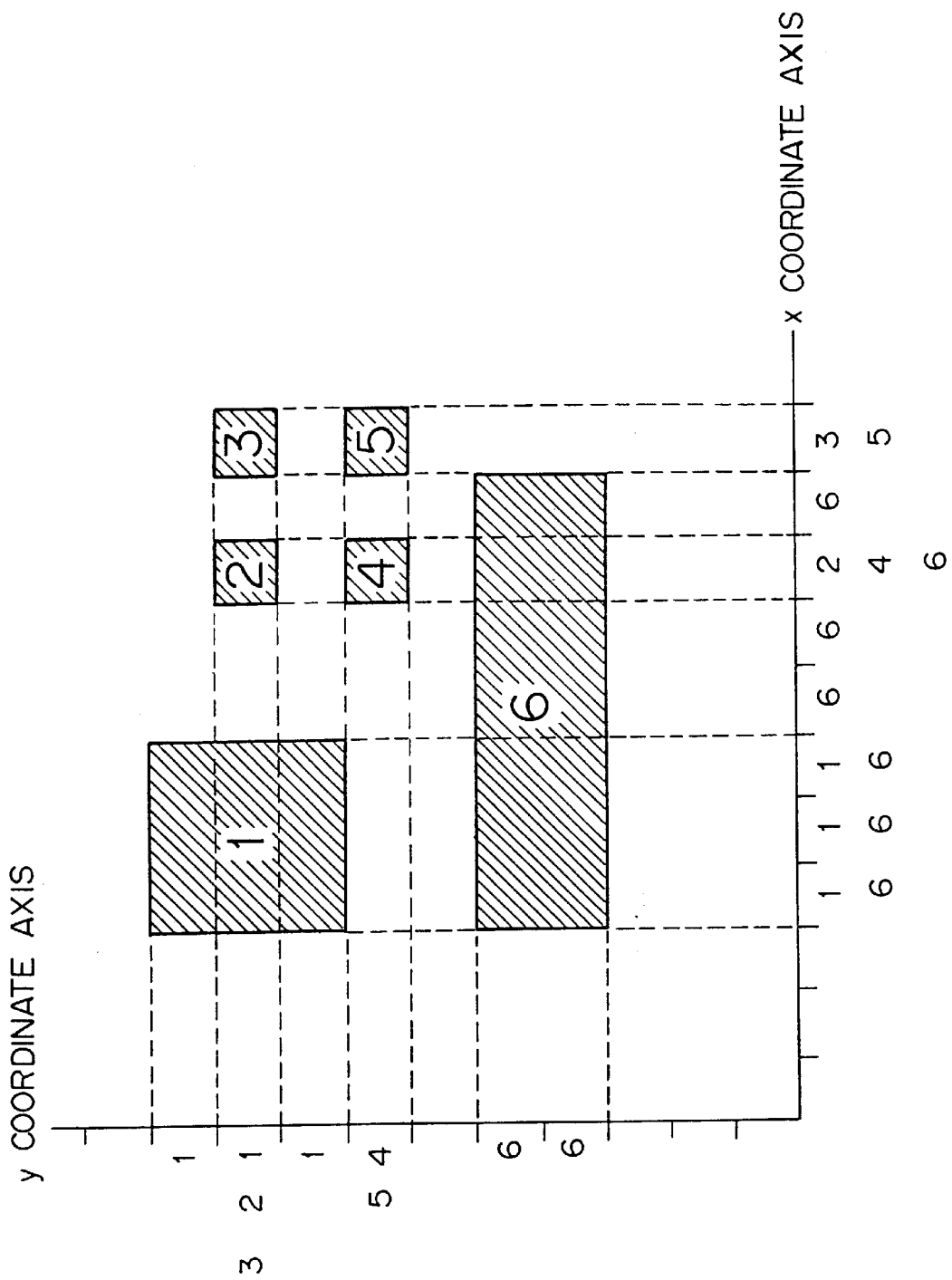
FIG. 22 shows an example of a projection table of rectangle numbers according to an embodiment of the present invention.

FIG. 22 shows an example of the method of projecting a rectangle number according to an embodiment of the present invention.

In FIG. 22, assuming that the enclosing rectangles having the rectangle numbers 1 through 6 are generated, each of the rectangle numbers 1 through 6 is projected on the x and y coordinate axes. For example, at the points where the x coordinates are 4 through 6, the enclosing rectangles having the rectangle numbers 1 and 6 are positioned. As a result, the rectangle numbers 1 and 6 are projected on the x coordinates 4 through 6. At the points where the x coordinates are 7, 8, and 10, the enclosing rectangle having the rectangle number 6 is positioned. As a result, the rectangle number 6 is projected on the x coordinates 7, 8, and 10. At the point where the x coordinate is 9, the enclosing rectangles having the rectangle numbers 2, 4, and 6 are positioned. As a result, the rectangle numbers 2, 4, and 6 are projected on the x coordinate 9. At the point where the x coordinate is 11, the enclosing rectangles having the rectangle numbers 3 and 5 is positioned. As a result, the rectangle numbers 3 and 5 is projected on the x coordinate 11. The similar processes are performed on the y coordinate.

Then, a candidate for a headline rectangle is selected (step S54). In selecting a candidate for a headline rectangle, a headline and characters forming a headline are selected. Basically, a portion obtained by multiplying a size of a text character by a predetermined number is defined as a candidate for a headline rectangle.

Figure 23:
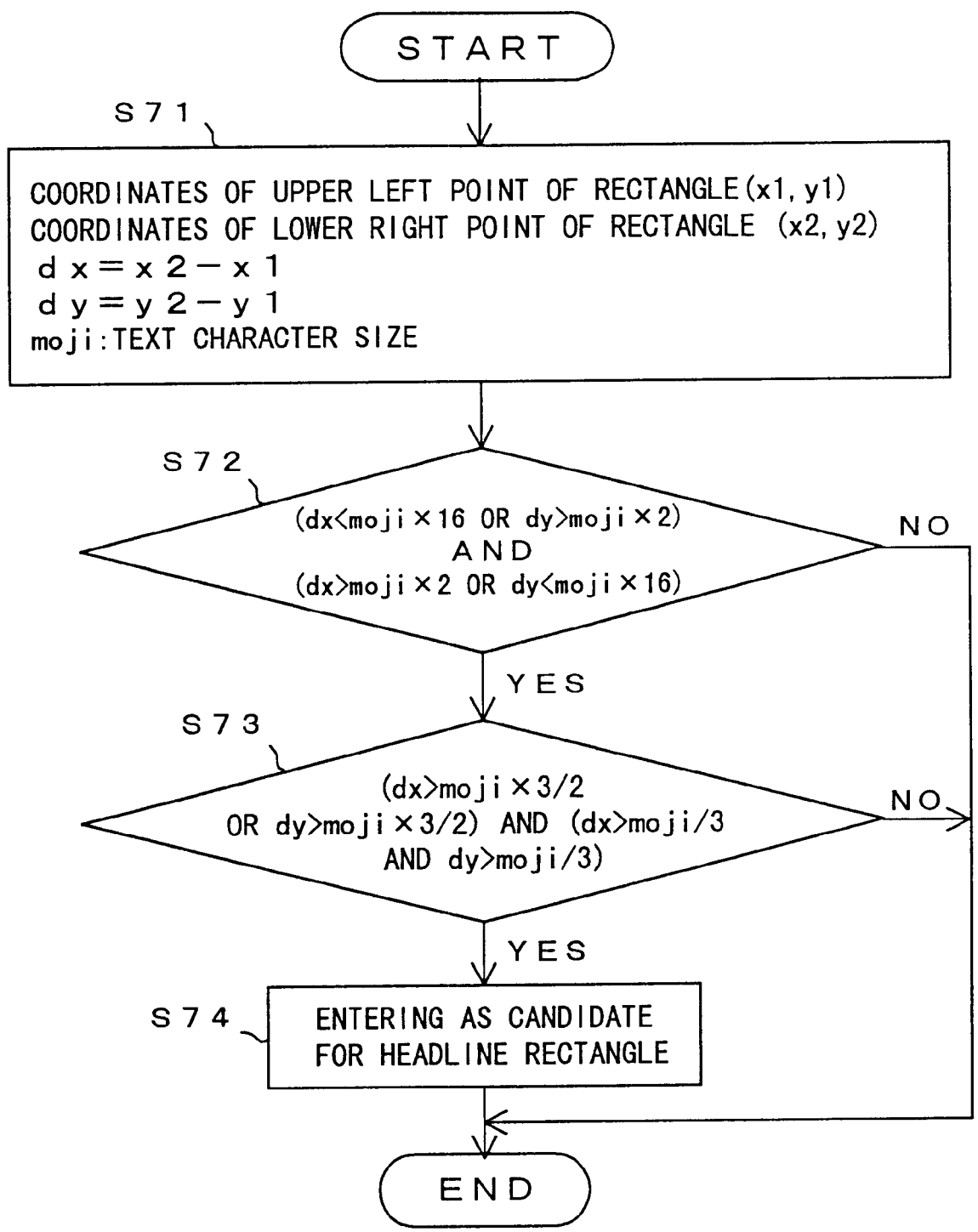
FIG. 23 is a flowchart showing the method of selecting a candidate for a headline rectangle according to an embodiment of the present invention.

FIG. 23 is a flowchart showing the method of selecting a candidate for a headline rectangle according to an embodiment of the present invention.

In FIG. 23, assume that the coordinates of the upper left point of the rectangle are (x1, y1), the coordinates of the lower right point of the rectangle are (x2, y2), the difference between the x coordinate x2 of the lower right point of the rectangle and the x coordinate x1 of the upper left point of the rectangle is dx, the difference between the y coordinate y2 of the lower right point of the rectangle and the y coordinate y1 of the upper left point of the rectangle is dy, and the text character size is moji (step S71).

Next, it is determined whether or not the following conditions are satisfied (step S72). If the conditions are not satisfied, then it is determined that the portion being processed is not a candidate for a headline rectangle, thereby terminating the process. If the conditions are satisfied, then control is passed to step S73.

$$(dx<moji\times 16 \text{ or } dy>moji\times 2)$$

and $$(dx>moji\times 2 \text{ or } dy<moji\times 16)$$

Then, it is determined whether or not the following conditions are satisfied (step S73). If the conditions are not satisfied, then it is determined that the portion being processed is not a candidate for a headline rectangle, thereby terminating the process. If the conditions are satisfied, then the portion being processed is entered as a candidate for a headline rectangle (step S74).

$$(dx>moji\times 3/2 \text{ or } dy>moji\times 3/2)$$

and (dx>moji/3 or dy>moji/3)

Then, a box rectangle is checked (step S55).

Assuming that the entire box, or the enclosing rectangle of a connected element forming part of the entire character box, is referred to as a box rectangle, the box rectangle cannot be a headline, and cannot be distinguished from a headline rectangle by size or shape. First, the box rectangle should be removed from all of the boxes. Normally, a character box contains a number of text characters, but a headline rectangle hardly contains text characters. Therefore, the number of candidates for text character boxes is counted in a rectangle to determine whether or not they are box rectangles. That is, the number of candidates for text character boxes in the enclosing rectangle is counted in a target area. If the number is larger than a predetermined value, then it is determined that the portion is an area enclosed by a box rectangle or a part of a box rectangle. A candidate for a text character box refers to an area of connected black picture elements enclosed by a rectangle of a text character size. The number of text characters in a character box can be efficiently computed using a projection table of candidates for character boxes.

Figure 24:
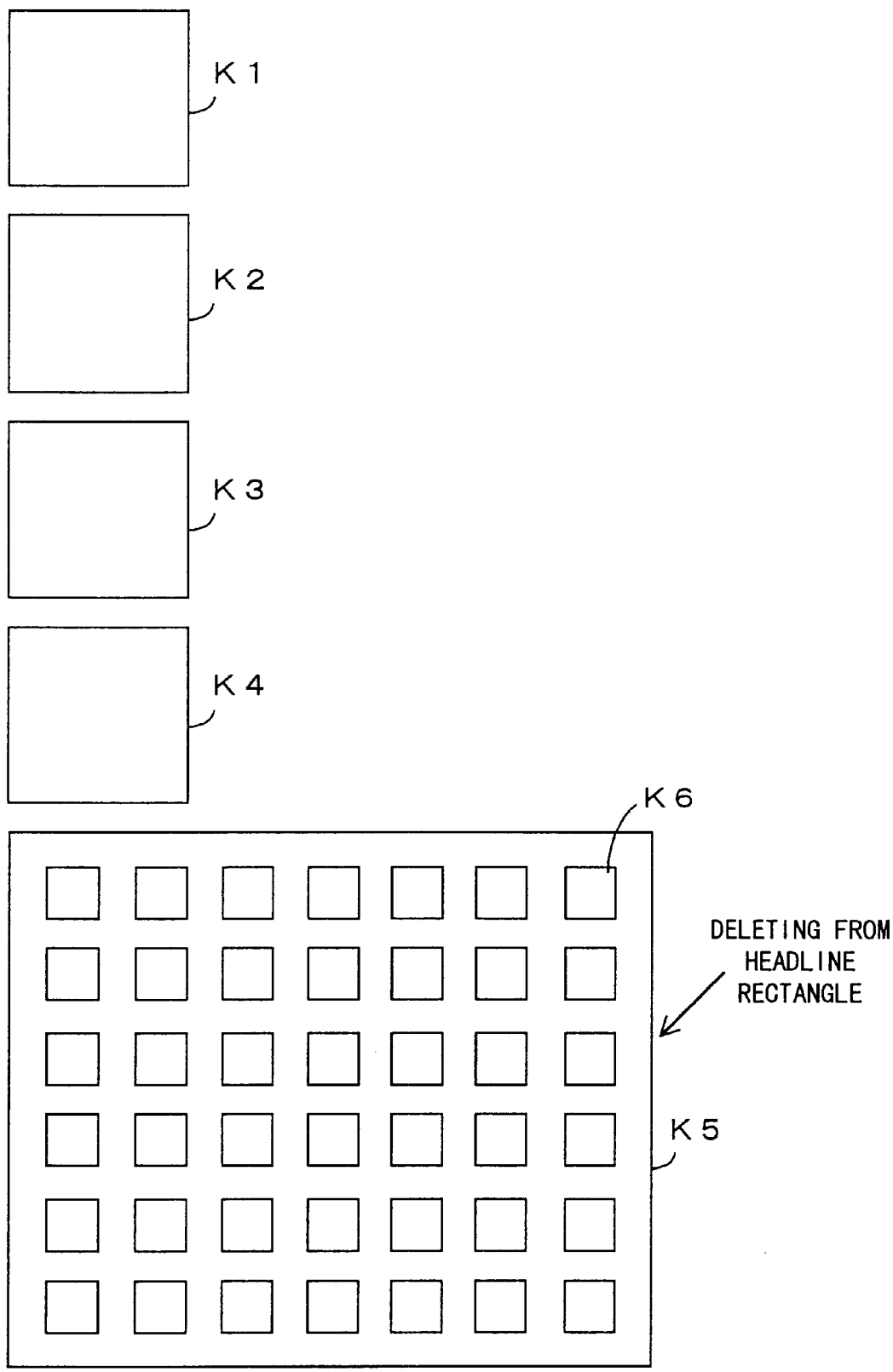
FIG. 24 shows the method of checking a box rectangle according to an embodiment of the present invention.

FIG. 24 shows the method of checking a box according to an embodiment of the present invention.

In FIG. 24, it is assumed that enclosing rectangles K1 through K6 are extracted, and the enclosing rectangles K1 through K5 are selected as candidates for headline character boxes. Assume that the enclosing rectangles K1 through K4 are enclose headline characters, and the enclosing rectangle K5 is a character box enclosing text characters. In this case, if the enclosing rectangles K1 through K5 are put in the same group, then a group of headline character enclosing rectangles include a rectangle enclosing non-headline characters. As a result, the headline characters cannot be correctly extracted, and therefore, it is necessary to remove the enclosing rectangle K5 from the candidates for headline character boxes.

Then, assuming that a character box enclosing text characters contains a number of text characters, the number of enclosing rectangles K6 of the size of text characters contained in the enclosing rectangles K1 through K5 selected as candidates for headline character boxes is counted.

As a result, since the enclosing rectangle K5 contains a number of the enclosing rectangles K6 of a text character size whereas the enclosing rectangles K1 through K4 do not contain an enclosing rectangle of a text character size, the enclosing rectangles K5 containing a number of the enclosing rectangles K6 of a text character size should be removed from the candidates for headline character boxes so that only the enclosing rectangles K1 through K4 can be correctly selected as candidates for headline character boxes.

Performed next is the partially-overlapping nest integrating process (step S56).

Candidates for headline character boxes may contain enclosing rectangles of connected elements comprising a part of a drawing or a photograph. These enclosing rectangles may be integrated into other correct headline rectangles, thereby causing an undesired influence. The undesired influence on the extraction of a headline rectangle should be reduced by absorbing or integrating the enclosing rectangle forming part of a drawing or a photograph into a larger rectangle. Normally, since rectangles forming part of a drawing or a photograph often overlap each other, which is a clue to easily detecting the rectangles. Therefore, the overlap level of enclosing rectangles is computed. If the level exceeds a predetermined threshold, it is determined that the enclosing rectangle is obtained as a part of a drawing or a photograph. Then, the overlapping nest integrating process is performed only on the rectangle. The overlap level of an enclosing rectangle indicates how many other enclosing rectangles overlap the enclosing rectangle.

FIG. 25 shows the overlapping nest integrating process according to an embodiment of the present invention.

It is assumed that, when the connected elements of the character '面' tare extracted as shown in FIG. 25, two connected elements R1 and R2 are extracted, and the enclosing rectangle K11 of the connected element R1 and the enclosing rectangle K12 of the connected element R2 are generated. When the overlapping nest integrating process is performed on the enclosing rectangles K11 and K12, the enclosing rectangle K13 encompassing the enclosing rectangles K11 and K12 is generated.

As a result, when a different label is assigned to each stroke of a character comprising a plurality of strokes, the strokes forming a character can be put in one group.

FIG. 26 shows the partially-overlapping nest integrating process according to an embodiment of the present invention.

Figure 26A:
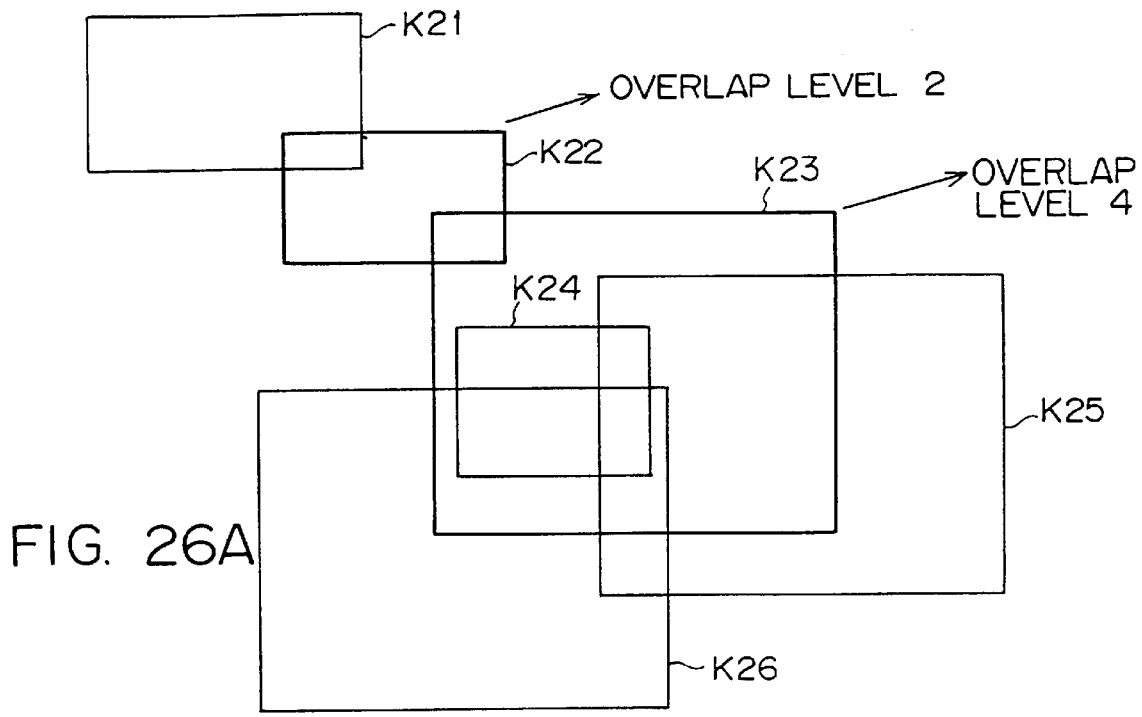
FIG. 26 shows the partially-overlapping nest integration according to an embodiment of the present invention.

In FIG. 26A, enclosing rectangles K21 through K26 are generated. In this case, for example, the enclosing rectangle K22 overlaps two enclosing rectangles K21 and K23. Therefore, the overlap level of the enclosing rectangle 22 is 2. Since the enclosing rectangle 23 overlaps four enclosing rectangles K22, and K24 through K26, the overlap level of the enclosing rectangle 23 is 4.

Figure 26B:
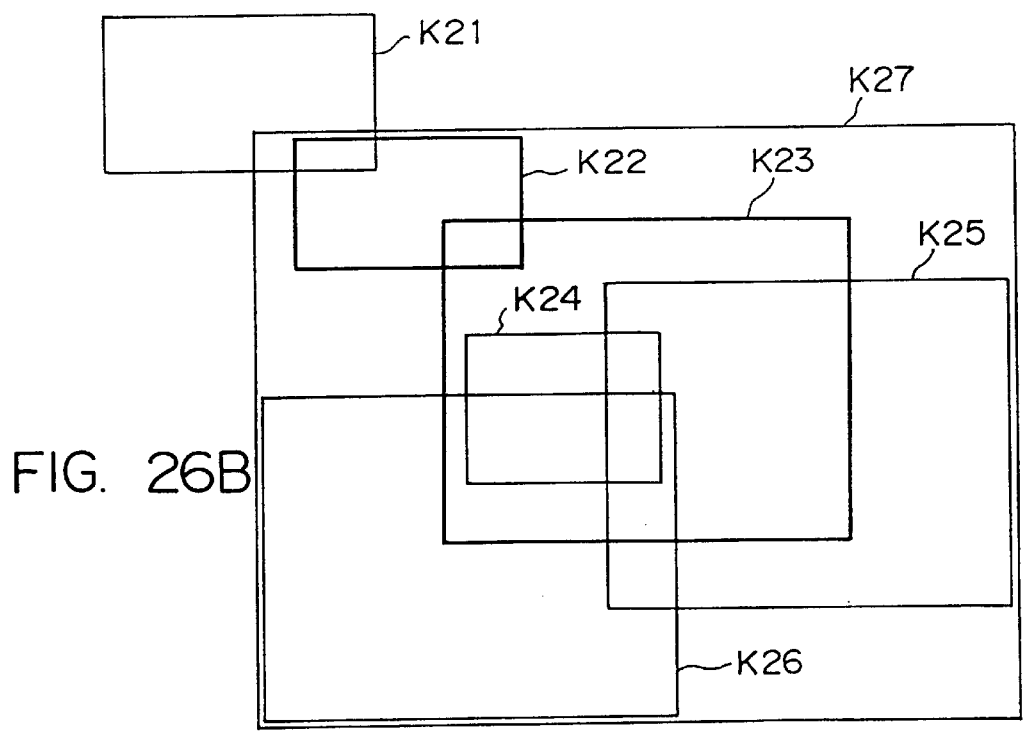

Assuming that the overlapping nest integrating process is performed only on the enclosing rectangles having the overlap level of 4 or higher, the enclosing rectangle 27 containing the enclosing rectangles K22 through K26 is generated as shown in FIG. 26B, and the enclosing rectangles K21 and K27 are not integrated.

For example, if the enclosing rectangle K21 is a headline character box, the enclosing rectangles K22 through K26 enclose the background pattern, and the overlapping nest integrating process is performed without considering the overlap level, then all the enclosing rectangles K21 through K26 are integrated, the headline character boxes are lost, and the headline character area cannot be extracted.

On the other hand, when the overlapping nest integrating process is not performed at all, the enclosing rectangles K21 through K26 separately exists, and the enclosing rectangles K22 through K26 of the background pattern against headline characters may be selected as candidates for headline rectangles. When the enclosing rectangles K22 through K26 of the background pattern against headline characters are selected as candidates for headline rectangles, headline characters cannot be correctly extracted.

Then, the enclosing rectangles K21 through K26 to be processed in the overlapping nest integrating process are selected based on the overlap level, and the overlapping nest integrating process is performed only on the enclosing rectangles K22 through K26. As a result, the enclosing rectangles K22 through K26 of the background pattern against headline characters are absorbed in the enclosing rectangle K27, thereby preventing the enclosing rectangles K22 through K26 from being selected as candidates for headline rectangle. Furthermore, the enclosing rectangle K21 of the headline characters can be maintained as is, thereby improving the precision in extracting headline characters.

The overlap level can be computed as described below.

First, as shown in FIG. 22, a projection table of candidates for headline rectangles is generated by the method shown in FIG. 22. Then, the overlap level is computed for each picture element of a candidate for a headline rectangle by referring to a headline rectangle number based on the x coordinate axis projection table and the y coordinate axis projection table.

Performed next is the rectangular integration (step S57).

In integrating rectangles, headline rectangles are integrated. First, the vicinity area of a target headline rectangle is defined, and another headline rectangle a part of which is contained in the vicinity area is checked. Then, it is determined whether or not the target headline rectangle can be integrated into the headline rectangle in the vicinity area. At this time, the vicinity area is defined and the integration conditions are determined for both vertically and horizontally printed characters.

Figure 27:
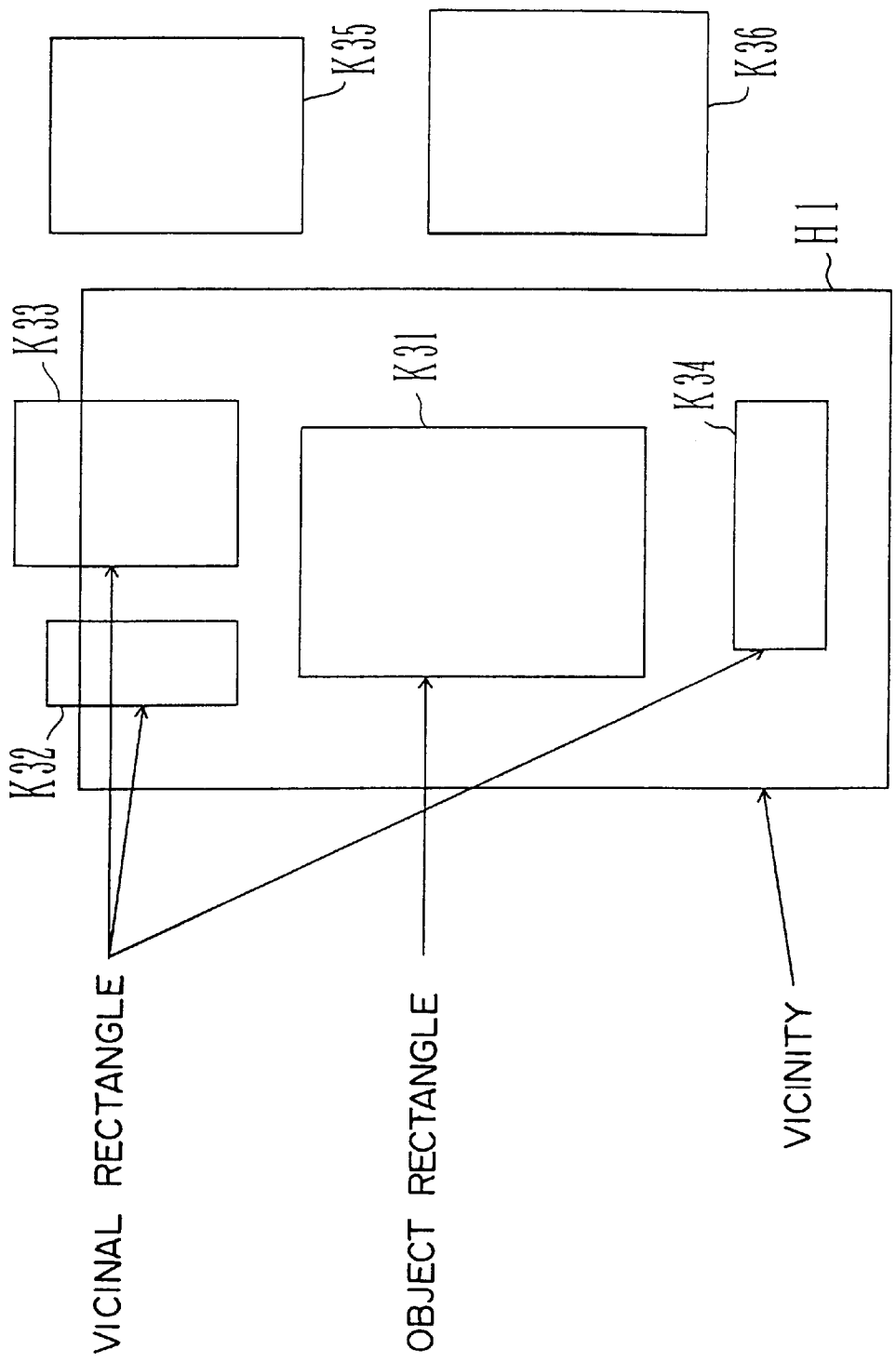
FIG. 27 shows an example of a rectangle in the vicinity according to an embodiment of the present invention.

FIG. 27 shows an example of a vicinal rectangle according to an embodiment of the present invention.

In FIG. 27, assuming that the enclosing rectangles K31 through K36 are generated and a vicinity area is determined using the enclosing rectangle K31 as a target rectangle, the vicinity area H1 is set within a predetermined range of the enclosing rectangle K31. The enclosing rectangle K32 through K34 within the vicinity area H1 are selected as candidates for enclosing rectangles to be integrated into the enclosing rectangle K31. The enclosing rectangles K35 and K36 are removed from the candidates for the enclosing rectangles to be integrated into the enclosing rectangle K31.

Figure 28:
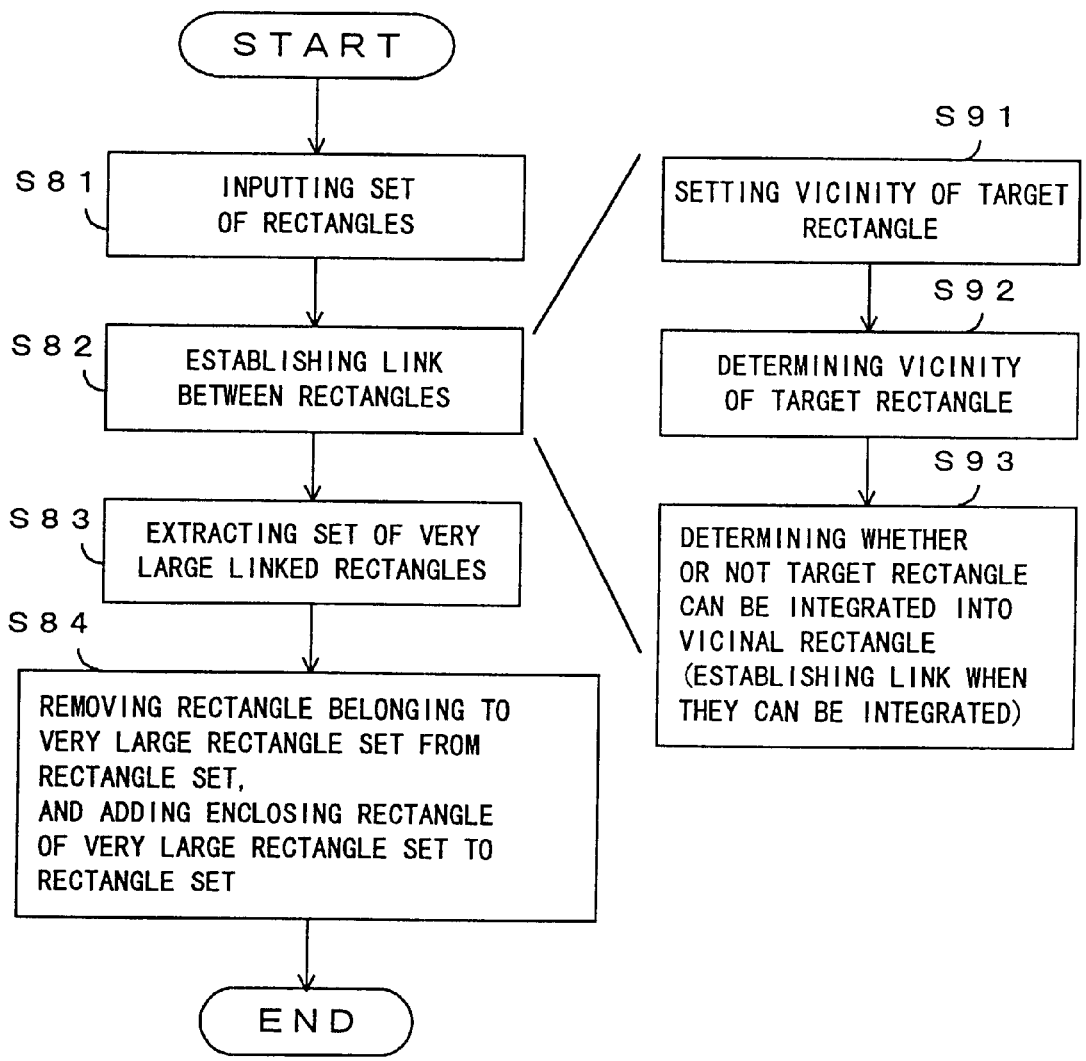
FIG. 28 is a flowchart showing the vicinity integrating process according to an embodiment of the present invention.

FIG. 28 is a flowchart showing the vicinity integrating process according to an embodiment of the present invention.

First, in FIG. 27, a set of rectangles are input (step S81) to establish a link between rectangles (step S82). In establishing a link between rectangles, a target rectangle is set first (step S91), and an enclosing rectangle in the vicinity of the target rectangle is extracted, thereby determining the vicinal rectangle of the target rectangle (step S92). Thus, considering the relative position between the target rectangle and the vicinal rectangle, the thickness of a character line, the density of black picture elements in each rectangle, etc., the possibility of the integration of the target rectangle and the vicinal rectangle is determined. If it is determined that the target rectangle and the vicinal rectangle can be integrated, a link is established.

Next, a set of very large linked rectangles are extracted (step S83). Rectangles belonging to the set of very large rectangles are deleted from the set of rectangles input in step S81, and an enclosing rectangle of the set of very large rectangles is added to the set of rectangles (step S84).

Performed next is the overlapping rectangle removing process (step S58).

In this overlapping rectangle removing process, one of overlapping rectangles is deleted to avoid double rectangles in the integrated headline rectangles.

Figure 29:
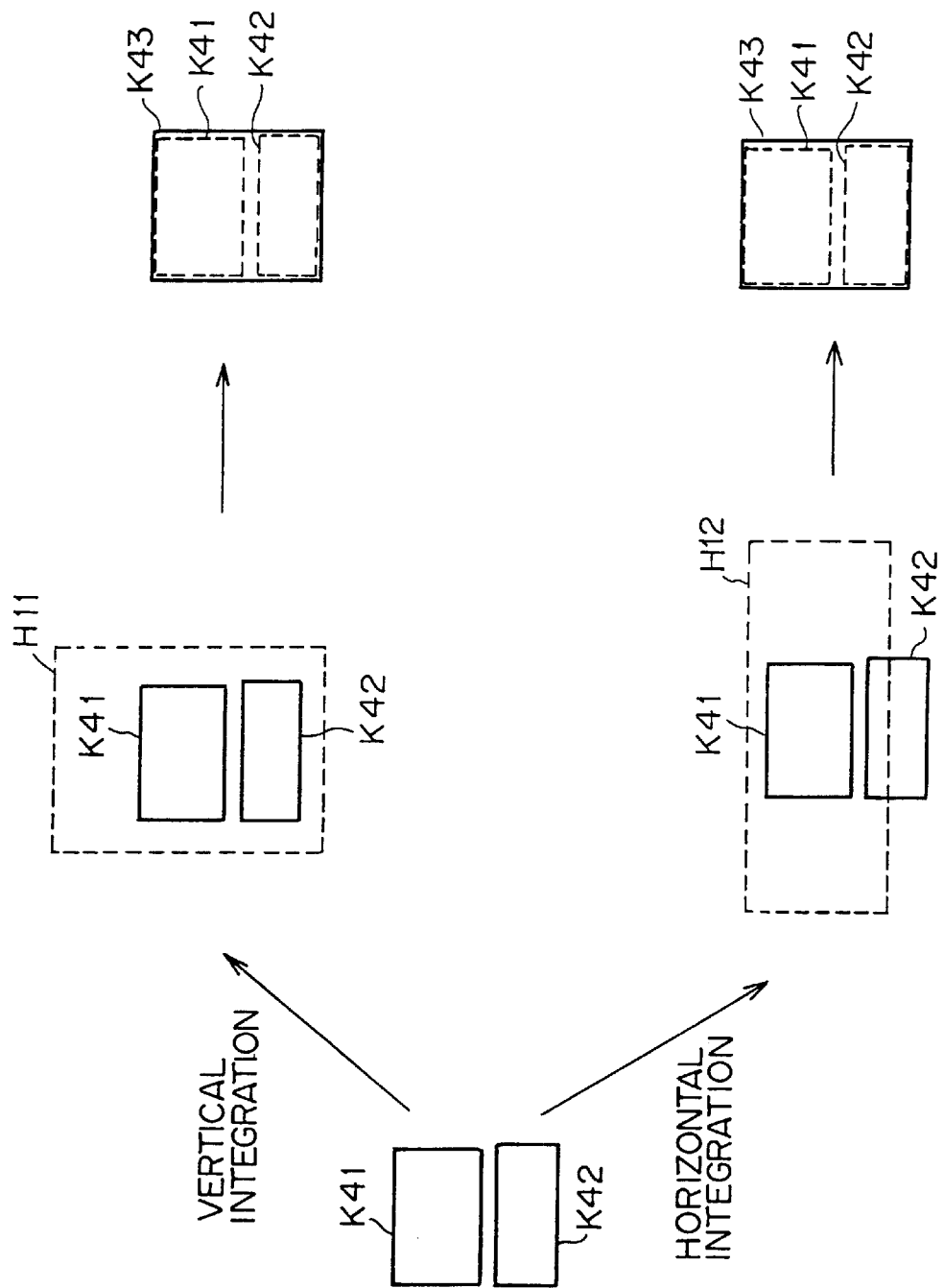
FIG. 29 shows an example of overlapping rectangles according to an embodiment of the present invention.

FIG. 29 shows an example of double rectangles according to an embodiment of the present invention.

In FIG. 29, when the enclosing rectangles K41 and K42 are extracted, and vertical integration is performed using the enclosing rectangle K41 as a target rectangle, the vicinal area H11 is set around the enclosing rectangle K41. If the enclosing rectangle K42 in the vicinal area H11 is extracted, and it is determined that the enclosing rectangles K41 and K42 can be integrated, then the enclosing rectangle K43 including the enclosing rectangles K41 and K42 is generated.

On the other hand, if horizontal integration is performed using the enclosing rectangle K41 as a target rectangle, then the vicinal area H12 is set around the enclosing rectangle K41. If the enclosing rectangle K42 in the vicinal area H12 is extracted, and it is determined that the enclosing rectangles K41 and K42 can be integrated, then the enclosing rectangle K43 including the enclosing rectangles K41 and K42 is generated.

As a result, since the two same enclosing rectangles K43 are generated, one of the enclosing rectangle K43 is deleted.

Then, a check is made on a box rectangle (step S59).

In this box rectangle check, it is determined whether or not an obtained headline rectangle is a box rectangle using a projection table, and a box rectangle is removed from headline rectangles.

Then, a headline rectangle is marked (step S60). In marking a headline rectangle, a mark is assigned to an obtained headline rectangle based on its size and shape.

Figure 30:
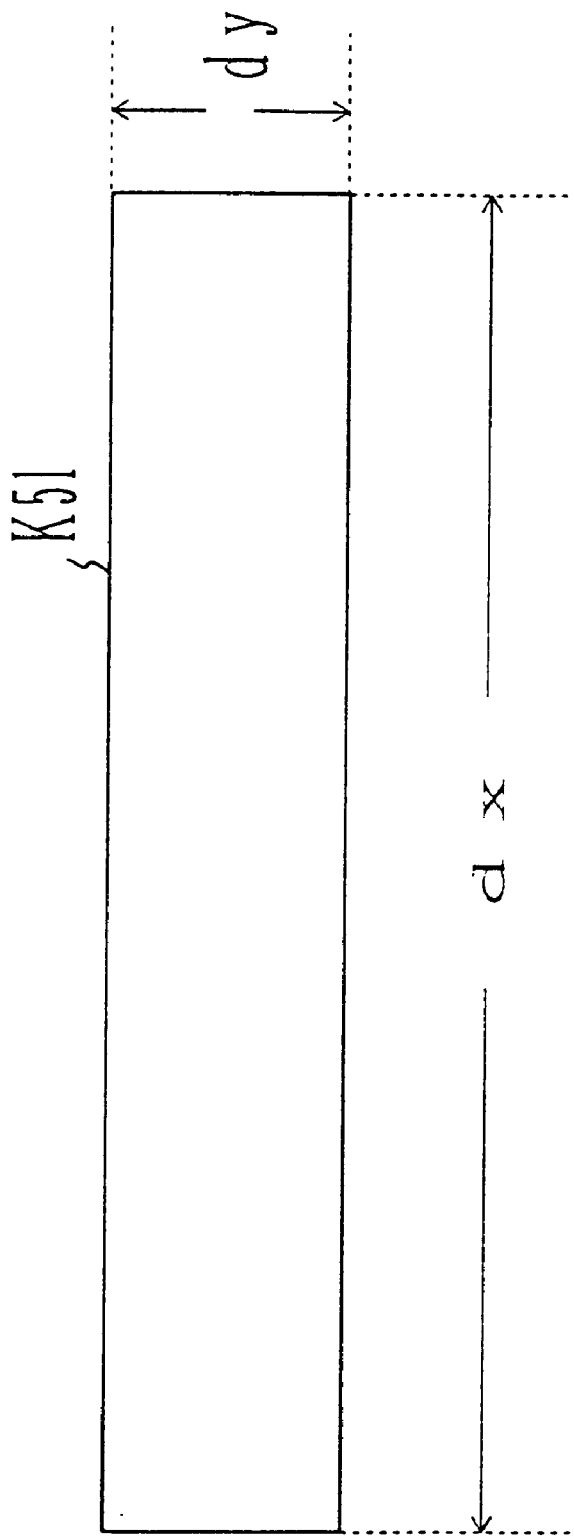
FIG. 30 shows the method of marking a headline rectangle according to an embodiment of the present invention.

FIG. 30 shows the method of marking a headline rectangle according to an embodiment of the present invention.

In FIG. 30, an enclosing rectangle K51 is generated. Assuming that the width and the length of the enclosing rectangle K51 is dx and dy respectively, the mark of the enclosing rectangle K51 is computed by the following equation.

$$mark = (1 + \alpha \times ratio) \times (dx \times dy)$$

$$ratio = max(dx, dy)/min(dx, dy)$$

where $\alpha$ indicates a parameter.

When a plurality of titles comprising headline characters are obtained from a document image by computing the mark, the titles can be assigned priority numbers for output.

According to the present invention as described above, since connected elements are grouped based on familial similarity, a character recognizing process is performed for each group to assign a character string level and extract a group of consistent combinations. Therefore, a character string can be extracted from a complicated image comprising a background pattern containing a combination of white and black portions, various types of fonts, a color document, a plurality of lines, a combination of vertical and horizontal character strings, and a compound of them.

According to a further aspect of the present invention, since a color is not determined, a character string area is not assumed during an extracting process, or standard line width of a character is not determined in the extracting process, a character color is not mis-recognized or a relatively thin line cannot be missed, thereby improving the precision in extraction of a character string.

According to a further aspect of the present invention, a combination of portions, whose areas do not overlap each other based on the recognition results of the patterns obtained from an input image and its black/white inverse image, is defined as an extraction result of the pattern from the input image. In the conventional technology, when characters formed by black picture elements and white characters against the black background co-exist in a headline of newspapers, etc., the color of a character is determined by the number of black character candidates and white character candidates. Therefore, when it is determined that the character color is black, only the connected elements of the input image is to be processed thereafter and a black character can be correctly recognized, but a white character against the black background cannot be recognized. Similarly, when it is determined that the character color is white, only the connected elements of the black/white inverse image is to be processed for character recognition and a white character against the black background can be correctly recognized, but a black character cannot be recognized. According to the present invention, the above described mis-recognition can be avoided. Thus, a character string can be extracted with precision from a complicated image comprising a background pattern containing a combination of white and black portions, various types of fonts, a color document, a plurality of lines, a combination of vertical and horizontal character strings, and a compound of them.

According to a further aspect of the present invention, the frequency of an enclosing rectangle is weighted by the area of the enclosing rectangle. Therefore, even if a character is formed by a plurality of separate strokes, not processed in the overlapping nest integrating process, and therefore an enclosing rectangle generated for each stroke remains as is, the enclosing rectangle formed by a part of one character is smaller than an enclosing rectangle formed for an entire character. As a result, the evaluation of the frequency of the enclosing rectangle formed by a part of one character can be set lower, and the influence of the size of a part of a character can be reduced in estimating the size of a character. Therefore, the character size can be estimated with high precision even when the overlapping nest integrating process is not performed.

According to a further aspect of the present invention, the number of text characters in a character box is counted. Therefore, when headline characters are extracted from newspapers, etc., and when a rectangular character box enclosing text characters exists near the headline characters, only the box rectangle can be extracted, thereby distinguishing the rectangular character box from the enclosing rectangle for the headline characters. As a result, only the headline characters can be extracted with high precision.

According to a further aspect of the present invention, a rectangle number assigned to an enclosing rectangle is projected to each coordinate set on the input image. Therefore, an enclosing rectangle existing in another enclosing rectangle can be easily extracted. As a result, even if a rectangular character box enclosing text characters and headline characters coexist, only the box rectangle can be quickly extracted.

According to a further aspect of the present invention, an overlapping nest integrating process is partially performed. Therefore, the overlapping nest integrating process is performed only on the enclosing rectangles having a high overlap level, and the process can be omitted on enclosing rectangles having a low overlap level. As a result, an enclosing rectangle of headline characters can be prevented from being lost by enclosing rectangles being integrated on the entire screen, and a part of a drawing or a photograph having a high overlap level can be absorbed or integrated into a larger rectangle. Thus, it can be avoided that an enclosing rectangle of a part of a drawing or a photograph remains as is to be mistakenly extracted as headline characters or mistakenly integrated into a rectangle as headline characters. As a result, headline characters can be extracted with high precision even if the headline characters coexist with a drawing, a photograph, etc.

According to another aspect of the present invention, a rectangle number assigned to an enclosing rectangle is projected to each coordinate set on the input image. Therefore, enclosing rectangles overlapping each other can be easily extracted, thereby quickly computing the overlap level of the enclosing rectangles.

What is claimed is:

1. A character extraction apparatus for extracting a character string from an image, comprising:
   a connected element extraction unit extracting connected elements containing serial picture elements of a same color based on a color of the picture elements of an input image;
   a grouping unit dividing the connected elements into groups probably having same character strings or same character string groups based on relative positions of the connected elements and a thickness of the connected elements;
   a character recognition unit performing a character recognizing process on each group, and defining a character recognition level of a group based on a distance value of a first character candidate of each character;
   a combination evaluation unit defining, as a group evaluation value, a value obtained by weighting the character recognition level of the group by an area of a rectangular area occupied by the group, and defining, as a combination evaluation value, a sum of the group evaluation values of all combinations of groups; and
   a character string extraction unit extracting as a character string a combination of groups having a highest combination evaluation value.

2. The apparatus according to claim 1 wherein,
   thickness of the connected elements is represented by a ratio of a number of boundary picture elements to a total number of picture elements of the connected element.

3. The apparatus according to claim 1 wherein,
   said connected elements containing a series of black picture elements are extracted from an input image and a black/white inverse image of the input image when the input image is a binary black-and-white image.

4. The apparatus according to claim 1 wherein,
   only groups occupying rectangular areas not overlapping each other are associated, and all combinations of groups having rectangular areas not overlapping each other are obtained.

5. A pattern extraction apparatus comprising:
   an inverse image generation unit generating an inverse image obtained by changing a label of an input image;
   a recognition unit performing a pattern recognizing process on a pattern extracted from the input image and a pattern extracted from the inverse image;
   an output unit outputting a non-overlapping combination of an area of a pattern extracted from the input image and an area of a pattern extracted from the inverse image generated by said inverse image generation unit from among recognition results from said recognition unit.

6. A pattern recognition apparatus, comprising:
   a first pattern recognition unit performing a pattern recognizing process on a first area of an input image;
   a second pattern recognition unit performing a patten recognizing process for an inverse image of the input image on a second area of the input image; and
   an output unit outputting a recognition result based on a non-overlapping combination area of a pattern extracted from said first pattern recognition unit and an area of a pattern extracted from said second pattern recognition unit as a recognition result of the input image.

7. A method of extracting a pattern, comprising:
   recognizing a pattern obtained from an input image and a white/black inverse image of the input image; and
   defining in recognition result a combination of an area of a pattern obtained from the input image and a white/black inverse image of the input image not overlapping each other as an extraction result of a pattern from the input image.

8. A computer-readable storage medium storing a program used to direct a computer to execute a process for extracting a character string from an image, said process comprising:
   extracting connected elements containing serial picture elements of a same color based on a color of the picture elements of an input image;
   dividing the connected elements into groups probably having same character string or same character string groups based on relative positions of the connected elements and a thickness of the connected elements;
   performing a character recognizing process on each group, and defining a character recognition level of a group based on a distance value of a first character candidate of each character;
   defining, as a group evaluation value, a value obtained by weighting the character recognition level of the group by an area of a rectangular area occupied by the group, and defining, as a combination evaluation value, a sum of the group evaluation values of all combinations of groups; and
   extracting as a character string a combination of groups having a highest combination evaluation value.

9. A character extraction apparatus for extracting a character string from an image, comprising:
   connected element extraction means for extracting connected elements containing serial picture elements of a same color based on a color of the picture elements of an input image;
   grouping means for dividing the connected elements into groups probably having same character strings or same character string groups based on relative positions of the connected elements and a thickness of the connected elements;

character recognition means for performing a character recognizing process on each group, and defining a character recognition level of a group based on a distance value of a first character candidate of each character;

combination evaluation means for defining, as a group evaluation value, a value obtained by weighting the character recognition level of the group by an area of a rectangular area occupied by the group, and defining, as a combination evaluation value, a sum of the group evaluation values of all combinations of groups; and character string extraction means for extracting as a character string a combination of groups having a highest combination evaluation value.

* * * * *